(12) United States Patent
Chang

(10) Patent No.: US 8,874,653 B2
(45) Date of Patent: Oct. 28, 2014

(54) VEHICLE SECURITY AND CUSTOMIZATION

(71) Applicant: Maximilian A. Chang, Saratoga, CA (US)

(72) Inventor: Maximilian A. Chang, Saratoga, CA (US)

( * ) Notice: Subject to any disclaimer, the term of this patent is extended or adjusted under 35 U.S.C. 154(b) by 0 days.

(21) Appl. No.: 14/270,065

(22) Filed: May 5, 2014

(65) Prior Publication Data

US 2014/0240089 A1    Aug. 28, 2014

Related U.S. Application Data

(63) Continuation-in-part of application No. 13/674,920, filed on Nov. 12, 2012.

(51) Int. Cl.
| | | |
|---|---|---|
| *G06Q 10/10* | (2012.01) | |
| *G07C 9/00* | (2006.01) | |
| *B60R 16/02* | (2006.01) | |
| *G06Q 50/00* | (2012.01) | |

(52) U.S. Cl.
CPC ............ *G07C 9/00111* (2013.01); *B60R 16/02* (2013.01); *G06Q 10/10* (2013.01); *G06Q 50/00* (2013.01)
USPC .............................. 709/204; 370/312; 705/1.1

(58) Field of Classification Search
None
See application file for complete search history.

(56) References Cited

U.S. PATENT DOCUMENTS

| | | |
|---|---|---|
| 8,332,517 B2 | 12/2012 | Russell |
| 8,355,670 B2 | 1/2013 | White |
| 8,466,792 B2 | 6/2013 | Svalesen |
| 2004/0012481 A1 | 1/2004 | Brusseaux |
| 2007/0286100 A1 | 12/2007 | Saaranen |
| 2008/0172290 A1 | 7/2008 | Masucci |
| 2009/0006628 A1 | 1/2009 | Webb |
| 2010/0030578 A1 | 2/2010 | Siddique |
| 2010/0057624 A1 | 3/2010 | Hurt |
| 2010/0090819 A1 | 4/2010 | Benedict |
| 2010/0250376 A1 | 9/2010 | Nandiraju |
| 2010/0280956 A1 | 11/2010 | Chutorash |
| 2011/0076943 A1* | 3/2011 | Chang .......................... 455/41.1 |
| 2011/0112901 A1 | 5/2011 | Fried |
| 2011/0136429 A1 | 6/2011 | Ames |
| 2011/0215900 A1* | 9/2011 | Corradino et al. ............ 340/5.53 |
| 2011/0216671 A1* | 9/2011 | Walley et al. .................. 370/255 |
| 2011/0234427 A1 | 9/2011 | Ingram |
| 2011/0320243 A1 | 12/2011 | Khan |

(Continued)

OTHER PUBLICATIONS

U.S. Office Action in U.S. Appl. No. 13/674,927, mailed on Jun. 27, 2013.

(Continued)

*Primary Examiner* — John G Weiss
*Assistant Examiner* — Christopher Stroud
(74) *Attorney, Agent, or Firm* — Fish & Richardson P.C.

(57) ABSTRACT

Techniques are described for enhancing security, customization, and/or group interaction of users in vehicles. For instance, a mobile device of an owner of a vehicle may be registered in a manner that allows the mobile device to control operation of the vehicle and authorize guest user operation of the vehicle. In addition, the vehicle may be adapted to receive preferred vehicle settings from mobile devices positioned in the vehicle, such as a mobile device of a guest user, and customize the vehicle settings based on the retrieved preferences. Further, the vehicle may be equipped to communicate with in-pavement vehicle detection systems and enable interaction in an ad hoc group with other vehicles positioned to connect to the in-pavement vehicle detection systems.

17 Claims, 7 Drawing Sheets

(56) References Cited

U.S. PATENT DOCUMENTS

| | | | |
|---|---|---|---|
| 2012/0176237 A1 | 7/2012 | Tabe | |
| 2012/0197460 A1* | 8/2012 | Seymour et al. | 701/1 |
| 2012/0197691 A1 | 8/2012 | Grigg | |
| 2012/0221173 A1 | 8/2012 | Ampunan | |
| 2012/0282913 A1 | 11/2012 | Kaindl | |
| 2012/0296708 A1 | 11/2012 | Bachmann | |
| 2012/0303178 A1 | 11/2012 | Hendry | |
| 2013/0035117 A1 | 2/2013 | Litkouhi | |
| 2013/0086164 A1* | 4/2013 | Wheeler et al. | 709/204 |
| 2013/0103542 A1 | 4/2013 | Abuelsaad | |
| 2013/0117369 A1* | 5/2013 | Appelman et al. | 709/204 |
| 2013/0144470 A1* | 6/2013 | Ricci | 701/2 |

OTHER PUBLICATIONS

U.S. Office Action in Appl. No. 13/674,927, mailed on Feb. 28, 2013.

"NFC Activity Specification", NFC Forum, Technical Specification, Activity 1.0, Nov. 18, 2010, pp. 1-117, retrieved from <http://www.nfc-forum.org/specs/spec_list/>.

"NFC Analog Specification", NFC Forum, Technical Specification, Analog 1.0, Jul. 11, 2012, pp. 1-89, retrieved from <http://www.nfc-forum.org/specs/spec_list/>.

"Connection Handover", NFC Forum, Technical Specification, Connection Handover 1.2, Jul. 7, 2010, pp. 1-27, retrieved from <http://www.nfc-forum.org/specs/spec_list/>.

"NFC Controller Interface (NCI) Specification", NFC Forum, Technical Specification, NCI 1.0, Nov. 6, 2012, pp. 1-146, retrieved from <http://www.nfc-forum.org/specs/spec_list/>.

"NFC Data Exchange Format (NDEF)", NFC Forum, Technical Specification, NDEF 1.0, Jul. 24, 2006, pp. 1-25, retrieved from <http://www.nfc-forum.org/specs/spec_list/>.

"NFC Digital Protocol", NFC Forum, Technical Specification, Digital 1.0, Nov. 17, 2010, pp. 1-194, retrieved from <http://www.nfc-forum.org/specs/spec_list/>.

"Logical Link Control Protocol", NFC Forum, Technical Specification, LLCP 1.1, Jun. 20, 2011, pp. 1-47, retrieved from <http://www.nfc-forum.org/specs/spec_list/>.

NFC Record Type Definition (RTD), NFC Forum, Technical Specification, RTD 1.0, Jul. 24, 2006, pp. 1-20, retrieved from <http://www.nfc-forum.org/specs/spec_list/>.

"Signature Record Type Definition", NFC Forum, Technical Specification, Signature 1.0, Nov. 18, 2010, pp. 1-18, retrieved from <http://www.nfc-forum.org/specs/spec_list/>.

"Simple NDEF Exchange Protocol", NFC Forum, Technical Specification, SNEP 1.0, May 3, 2013, pp. 1-19, retrieved from <http://www.nfc-forum.org/specs/spec_list/>.

"Smart Poster Record Type Definition", NFC Forum, Technical Specification, SPR 1.1, Jul. 24, 2006, pp. 1-15, retrieved from <http://www.nfc-forum.org/specs/spec_list/>.

"Text Record Type Definition", NFC Forum, Technical Specification, RTD-Text 1.0, Jul. 24, 2006, pp. 1-10, retrieved from <http://www.nfc-forum.org/specs/spec_list/>.

"Type 1 Tag Operation Specification", NFC Forum, Technical Specification, T1TOP 1.1, Apr. 13, 2011, pp. 1-47, retrieved from <http://www.nfc-forum.org/specs/spec_list/>.

"Type 2 Tag Operation Specification", NFC Forum, Technical Specification, T2TOP 1.1, May 31, 2011, pp. 1-53, retrieved from <http://www.nfc-forum.org/specs/spec_list/>.

"Type 3 Tag Operation Specification", NFC Forum, Technical Specification, T3TOP 1.1, Jun. 28, 2011, pp. 1-33, retrieved from <http://www.nfc-forum.org/specs/spec_list/>.

"Type 4 Tag Operation Specification", NFC Forum, Technical Specification, T4TOP 2.0, Jun. 28, 2011, pp. 1-40, retrieved from <http://www.nfc-forum.org/specs/spec_list/>.

"URI Record Type Definition", NFC Forum, Technical Specification, RTD-URI 1.0, Jul. 24, 2006, pp. 1-14, retrieved from <http://www.nfc-forum.org/specs/spec_list/>.

"Frequently Asked Questions", NFC Forum, Frequently Asked Questions, pp. 1-12, downloaded on May 20, 2013, retrieved from <http://www.nfc-forum.org/resources/faqs#ISO>.

Definition: FeliCa, from Wikipedia, Internet: http://en.wikipedia.org/wiki/FeliCa, printed Feb. 13, 2013, 6 pages.

ISO/IEC 18092, "International Standard: Information Technology—Telecommunications and information exchange between systems—Near Field Communication—Interface and Protocol (NFCIP-1)," First Edition, Apr. 1, 2004, 66 pages.

ISO/IEC 14443-4, "International Standard: Indentification Cards—Contactless integrated circuit cards—Proximity Cards—Part 4: Transmission Protocol," Second Edition, Jul. 15, 2008, 46 pages.

ISO/IEC 14443-4, "International Standard: Indentification Cards—Contactless integrated circuit cards—Proximity Cards—Part 4: Transmission Protocol, Amendment 1: Exchange of additional parameters," Second Edition, Amendment 1, Mar. 1, 2012, 10 pages.

ISO/IEC 14443-4, "International Standard: Indentification Cards—Contactless integrated circuit cards—Proximity Cards—Part 4: Transmission Protocol, Amendment 2: Bit rates of fc/8, fc/4 and fc/2, protocol activation of PICC Type A and frame size from 512 bytes to 4 096 bytes," Second Edition, Amendment 2, Sep. 15, 2012, 12 pages.

U.S. Appl. No. 13/674,927, filed Nov. 12, 2012.

* cited by examiner

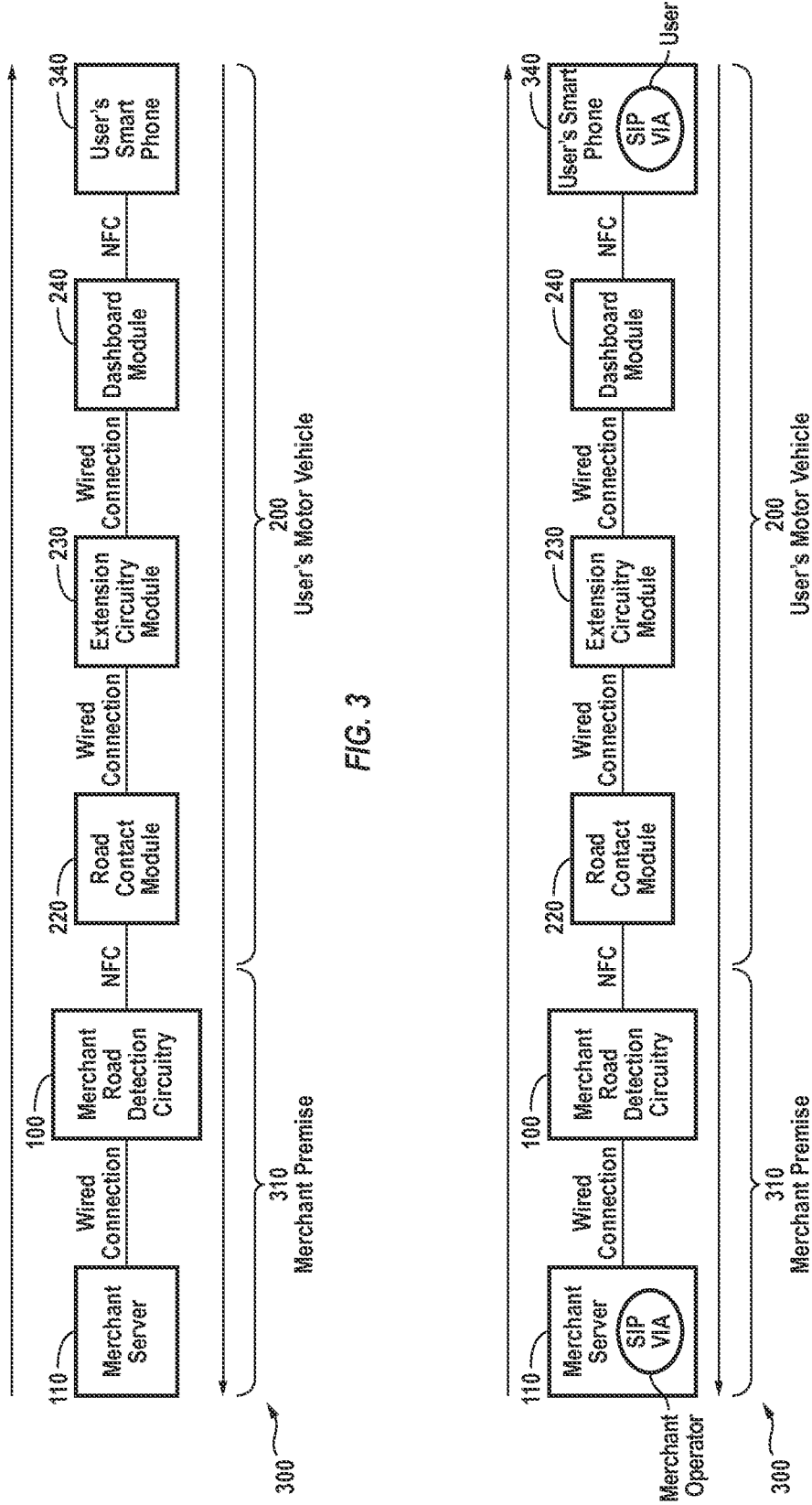

VEHICLE SECURITY AND CUSTOMIZATION

CROSS REFERENCE TO RELATED APPLICATIONS

This application is a continuation-in-part of U.S. patent application Ser. No. 13/674,920, filed Nov. 12, 2012, which is incorporated by reference in its entirety.

FIELD

The present disclosure relates to vehicle security and customization

BACKGROUND

Contactless payment transactions are well known in the art and are enabled by short-range wireless technologies such as Near Field Communications (NFC). NFC is a set of standards for communication protocols which enable NFC compliant devices to exchange data in very close proximity. NFC is based on Radio Frequency Identification (RFID) standards including ISO/IEC 14443, ISO/IEC 18092 and Felicity Card (FeliCa). NFC standards are governed by the NFC Forum founded by Nokia, Philips and Sony in 2004 and the Forum now has over 160 members worldwide. The NFC Forum is commissioned to promote the NFC standards and certify devices for NFC compliance worldwide.

NFC allows two-way communication between NFC devices. In addition, an unpowered NFC chip ("tag") can also be read by NFC devices, thereby enabling one-way communication as well.

NFC devices are usually used in contactless payment systems. For example, Google Wallet is a payment service and an Android app by Google to allow users to store credit card, debit card and store loyalty data on a virtual wallet—e.g., as an app downloadable to an NFC-enabled Android Smartphone—so that the user can simply tap the Android Smartphone at an NFC-enabled payment terminal to complete a sales transaction. The user can also bring his NFC-enabled Smartphone to very close proximity of an NFC-enabled payment terminal to complete the payment as well.

NFC technology is ideal for contactless payment due to its security features (matching encrypted security code and transporting access key) and extremely short transmission range (approximately 4 cm to 20 cm maximum).

At the point of sale, NFC-enabled payment terminals in the market include "PayPass" from MasterCard. MasterCard PayPass is a Europay, MasterCard and Visa (EMV) compatible, "contactless" payment feature based on the ISO/IEC 14443 standard that provides users with a simpler way to pay by tapping an NFC-enabled payment device such as an NFC-enabled Smartphone, on a point-of-sale payment terminal reader rather than swiping or inserting a card. There are an estimated 300,000 PayPass payment terminals deployed.

In September 2007, Visa introduced Visa PayWave, also a contactless payment technology feature that allows cardholders to wave their card in front of contactless payment terminals without the need to physically swipe or insert the card into a point-of-sale device. This is similar to the MasterCard PayPass service, with both using NFC or RFID technology.

In addition to Google Wallet, Verizon also offers, in partnership with AT&T and T-Mobile, a similar service called ISIS.

Known contactless payment systems require the availability of an NFC-enabled payment terminal at the point of sale. Such payment terminals are generally located at checkout areas in retail stores and are deployed in fixed locations. Users must physically bring an NFC-enabled payment device, such as an NFC-enabled Smartphone, to very close proximity of an NFC payment terminal or physically tap an NFC-enabled Smartphone on an NFC payment terminal in order to complete the transaction.

However, there are many situations where it may not be convenient for the user to bring an NFC-enabled Smartphone to an NFC-enabled payment terminal at a retail store. For example, when a user is driving a car and wishes to make payment from the NFC-enabled Smartphone, the user will be unable to complete such a transaction while inside a vehicle. Such needs may exist when the user, who is inside a motor vehicle, wishes to purchase with his NFC-enabled Smartphone parking, drive-in movies, bridge tolls or even food at a drive-through of a fast food restaurant. This disadvantage discourages wider adoption of the contactless payment technology.

SUMMARY

In one aspect, a vehicle includes a body carriage having rotatable wheels mounted thereunder. The rotatable wheels are configured to roll along a surface of a pavement and each of the rotatable wheels include a tire mounted on a rim. The vehicle also includes a vehicle extension system configured to communicate wirelessly with in-pavement vehicle detection systems embedded on or below pavement on which the rotatable wheels are configured to roll. The vehicle communication extension system includes one or more road contact transceivers arranged so that at least one of the one or more road contact transceivers is within a predetermined distance from an in-pavement vehicle detection system based on the rotatable wheels being located on pavement at a position above the in-pavement vehicle detection system. The one or more road contact transceivers are configured to transmit information to and receive information from the in-pavement vehicle detection system based on at least one of the one or more road contact transceivers being within the predetermined distance from the in-pavement vehicle detection system. The vehicle communication extension system also includes one or more wireless transceivers that are located in the vehicle and that are configured to communicate with personal mobile communication devices that are located within a passenger compartment of the vehicle. The vehicle communication extension system further includes extension circuitry electrically connected to the one or more road contact transceivers and the one or more wireless transceivers. The extension circuitry is configured to manage communications between the one or more road contact transceivers, the one or more wireless transceivers, in-pavement vehicle detection systems, and personal mobile communication devices. In addition, the extension circuitry is configured to detect a guest personal mobile communication device that is positioned to wirelessly communicate with at least one of the one or more wireless transceivers. The guest personal mobile communication device is a communication device of a guest user that is attempting to use the vehicle. The extension circuitry is configured to, based on detection of the guest personal mobile communication device, monitor for presence of an owner personal mobile communication device in position to wirelessly communicate with at least one of the one or more wireless transceivers. The owner personal mobile communication device has been registered to the extension circuitry as a device that is able to use the vehicle and authorize guests to use the vehicle. Further, the extension circuitry is configured to, based on the monitoring for presence of the owner personal mobile communication device, detect the owner personal mobile communication device in position to wirelessly communicate with at least one of the one or more wireless transceivers and, based on detection of the owner personal mobile communication device, authorize use of the vehicle by the guest personal mobile communication device and receive, from the guest personal mobile communication device through at least one of the one or more wireless transceivers, guest vehicle settings stored by the guest personal mobile communication device. The guest vehicle settings define preferences of the guest user for settings associated with use of the vehicle and settings associated with communications exchanged with in-pavement vehicle detection systems by the guest personal mobile communication device. The extension circuitry also is configured to, after authorization of use of the vehicle by the guest personal mobile communication device, detect a passenger personal mobile communication device that is positioned to wirelessly communicate with at least one of the one or more wireless transceivers. The passenger personal mobile communication device is a communication device of a passenger user who is located in the passenger compartment of the vehicle. The extension circuitry is further configured to, based on detection of the passenger personal mobile communication device, receive, from the passenger personal mobile communication device through at least one of the one or more wireless transceivers, passenger vehicle settings stored by the passenger personal mobile communication device. The passenger vehicle settings define preferences of the passenger user for settings associated with use of the vehicle and settings associated with communications exchanged with in-pavement vehicle detection systems by the passenger personal mobile communication device. And, the extension circuitry is configured to access, from electronic storage, vehicle rules that define permissible settings for the vehicle and evaluate the received guest vehicle settings and the received passenger vehicle settings with respect to the accessed vehicle rules. The accessed vehicle rules have been defined based on communication with the owner personal mobile communication device through at least one of the one or more wireless transceivers. The extension circuitry is configured to, based on the evaluation, determine current vehicle settings for settings associated with use of the vehicle by the guest user and the passenger user and settings associated with communications exchanged with in-pavement vehicle detection systems by the guest personal mobile communication device and the passenger personal mobile communication device. The current vehicle settings meet a subset of the preferences of the guest user and a subset of the preferences of the passenger user. The extension circuitry is configured to monitor for an ability to connect with the in-pavement vehicle detection system through at least one of the one or more road contact transceivers and, based on the monitoring for the ability to communicate with the in-pavement vehicle detection system, detect the ability to communicate with the in-pavement vehicle detection system. The in-pavement vehicle detection system is able to simultaneously connect with multiple vehicles through road contact transceivers. In addition, the extension circuitry is configured to, based on detection of the ability to communicate with the in-pavement vehicle detection system, add, in accordance with the current vehicle settings, the vehicle to an ad hoc social group that includes the multiple vehicles simultaneously connected to the in-pavement vehicle detection system through road contact transceivers. Further, the extension circuitry is configured to, based on the current vehicle settings, enable the passenger personal mobile communication device to interact with the ad hoc social group without revealing identifying information associated with the passenger personal mobile communication device and automatically, without user intervention, disconnect from the ad hoc social group based on the vehicle moving to a position in which the one or more road contact transceivers are outside of the predetermined distance from the in-pavement vehicle detection system.

In another aspect, a method may include one or more of the operations recited above. In yet another aspect, a computer-readable storage medium may be operable to cause a processor to perform one or more of the operations described above.

Implementations may include one or more of the following features. For example, the extension circuitry may be configured to enable the passenger personal mobile communication device to engage in a voice communication session that involves the multiple vehicles simultaneously connected to the in-pavement vehicle detection system through road contact transceivers. In this example, the voice communication session may be arranged through the in-pavement vehicle detection system without revealing telephone numbers of any of personal mobile communication device used to engage in the voice communication session.

In addition, the extension circuitry may be configured to enable the passenger personal mobile communication device to engage in a video communication session that involves the multiple vehicles simultaneously connected to the in-pavement vehicle detection system through road contact transceivers. The video communication session may be arranged through the in-pavement vehicle detection system without revealing telephone numbers of any of personal mobile communication device used to engage in the video communication session. Also, the extension circuitry may be configured to enable the passenger personal mobile communication device to engage in a text-messaging communication session that involves the multiple vehicles simultaneously connected to the in-pavement vehicle detection system through road contact transceivers. The text-messaging communication session may be arranged through the in-pavement vehicle detection system without revealing telephone numbers of any of personal mobile communication device used to engage in the video communication session.

The extension circuitry may be configured to automatically authorize use of the vehicle by the guest personal mobile communication device upon detection of the owner personal mobile communication device without requiring any input be provided at the owner personal mobile communication device. The extension circuitry may be configured to send, to the owner personal mobile communication device through at least one of the one or more wireless transceivers, a communication requesting authorization of the guest personal mobile communication device and receive, from the owner personal mobile communication device through at least one of the one or more wireless transceivers, a response indicating that the owner personal mobile communication device received input authorizing use of the vehicle by the guest personal mobile communication device.

Further, the extension circuitry may be configured to access, from electronic storage, vehicle rules that define permissible ranges of values for settings associated with use of the vehicle. The extension circuitry may be configured to access, from electronic storage, vehicle rules that define what information about the vehicle is available for sending in communications exchanged with in-pavement vehicle detection systems.

In some implementations, the extension circuitry may be configured to access, from electronic storage, vehicle rules that define priority criteria for resolving inconsistencies in preferred vehicle settings received from different personal mobile communication devices. In these implementations, the priority criteria indicating that preferred settings of a driver are given priority over preferred settings of a passenger for driver-related vehicle settings, that preferred settings of a passenger are given priority over preferred settings of a driver for passenger-related vehicle settings, and that preferred settings of a driver are given priority over preferred settings of a passenger for general vehicle settings that are not specific to a driver or a passenger.

In some examples, the extension circuitry may be configured to access, from electronic storage, vehicle rules that define best fit criteria for resolving inconsistencies in preferred vehicle settings received from different personal mobile communication devices. In these examples, the best fit criteria may be designed to result in one or more compromise settings that represent a best fit in matching all received settings without exactly matching any received setting. Also, the extension circuitry may be configured to access, from electronic storage, vehicle rules that adapt vehicle settings to a closest setting based on impermissible settings being received.

In some implementations, the extension circuitry may be configured to automatically, without user intervention, add the vehicle to the ad hoc social group. In these implementations, the ad hoc social group may be arranged in a closed configuration in which all communications between vehicles pass through the in-pavement vehicle detection system and only vehicles positioned to connect to the in-pavement vehicle detection system through a road contact transceiver are part of the ad hoc social group.

In some examples, the extension circuitry may be configured to determine that only the passenger personal mobile communication device is set to participate in ad hoc social groups based on the evaluation revealing that the received guest vehicle settings indicate that the guest user does not wish to participate in ad hoc social groups and that the received passenger vehicle settings indicate that the passenger user wishes to participate in ad hoc social groups. In these examples, the extension circuitry may be configured to determine that the current vehicle settings indicate that the passenger personal mobile communication device is set to participate in ad hoc social groups and the guest personal mobile communication device is not set to participate in ad hoc social groups and enable only the passenger personal mobile communication device to interact with the ad hoc social group based on the determination that the current vehicle settings indicate that the passenger personal mobile communication device is set to participate in ad hoc social groups and the guest personal mobile communication device is not set to participate in ad hoc social groups.

In some implementations, the extension circuitry may be configured to determine that the guest personal mobile communication device and the passenger personal mobile communication device are set to participate in ad hoc social groups based on the evaluation revealing that the received guest vehicle settings indicate that the guest user wishes to participate in ad hoc social groups and that the received passenger vehicle settings indicate that the passenger user wishes to participate in ad hoc social groups. In these implementations, the extension circuitry may be configured to determine that the current vehicle settings indicate that the passenger personal mobile communication device is set to participate in ad hoc social groups and the guest personal mobile communication device is set to participate in ad hoc social groups and enable both the guest personal mobile communication device and the passenger personal mobile communication device to interact with the ad hoc social group based on the determination that the current vehicle settings indicate that the passenger personal mobile communication device is set to participate in ad hoc social groups and the guest personal mobile communication device is set to participate in ad hoc social groups.

The extension circuitry may be configured to present the guest personal mobile communication device and the passenger personal mobile communication device to the ad hoc social as only the vehicle such that communications sent from the guest personal mobile communication device appear to the ad hoc social group in a same manner as communications sent from the passenger personal mobile communication device to the ad hoc social group. The extension circuitry also may be configured to present the guest personal mobile communication device and the passenger personal mobile communication device to the ad hoc social as separate devices within the vehicle such that communications sent from the guest personal mobile communication device appear to the ad hoc social group in a different manner than communications sent from the passenger personal mobile communication device to the ad hoc social group.

In some examples, the in-pavement vehicle detection system may be a first in-pavement vehicle detection system of a first type, the ad hoc social group may be a first ad hoc social group, and the extension circuitry may be configured to determine that the first in-pavement vehicle detection system has the first type and enable the passenger personal mobile communication device to interact with the first ad hoc social group based on the determination that the first in-pavement vehicle detection system has the first type. In these examples, the extension circuitry may be configured to detect the ability to communicate with a second in-pavement vehicle detection system of a second type and, based on detection of the ability to communicate with the second in-pavement vehicle detection system, add, in accordance with the current vehicle settings, the vehicle to a second ad hoc social group that includes multiple vehicles simultaneously connected to the second in-pavement vehicle detection system through road contact transceivers. The second in-pavement vehicle detection system may be different than the first in-pavement vehicle detection system and the second type may be different than the first type. In addition, the extension circuitry may be configured to, based on detection of the ability to communicate with the second in-pavement vehicle detection system, determine that the second in-pavement vehicle detection system has the second type and enable the guest personal mobile communication device to interact with the second ad hoc social group based on the determination that the second in-pavement vehicle detection system has the second type.

In some implementations, the extension circuitry may be configured to generate a first interface appropriate for interacting with the first ad hoc social group based on capabilities of the first in-pavement vehicle detection system and send, to the passenger personal mobile communication device through at least one of the one or more wireless transceivers, the generated first interface. In these implementations, the extension circuitry may be configured to generate a second interface appropriate for interacting with the second ad hoc social group based on capabilities of the second in-pavement vehicle detection system and send, to the guest personal mobile communication device through at least one of the one or more wireless transceivers, the generated second interface, which is different than the first interface.

In some implementations, a system incorporates mobile payment technology into a motor vehicle in order to allow a motorist (or user) to enjoy the benefits of mobile payment from the convenience of the motorist's motor vehicle. The system transforms a user's motor vehicle into a personal mobile payment terminal, and the user can make mobile payment from the convenience of the motor vehicle regardless of location. The system may include an implementation whereby a merchant mobile payment system is provided to detect the presence of a motor vehicle of a customer, identify the identity of the customer through the motor vehicle equipped with a Mobile Payment Extension Kit (MPEK), and deliver payment information to the customer. The customer's motor vehicle equipped with a MPEK allows the customer to simply tap an NFC-enabled device, such as an NFC-enabled Smartphone, on the dashboard of the vehicle (or any other touch point so equipped inside the customer's vehicle) to instantly obtain payment information and authorize payment from the car. In addition, the customer may also receive additional information from the merchant including advertisement information on the NFC-enabled device while making payment, which can create additional revenue opportunities for the merchant.

In another aspect, a vehicular-based mobile payment system includes a merchant system for sending and receiving information; a vehicle detection system connected to the merchant system; a vehicle comprising a mobile payment extension system, wherein the mobile payment extension system is adapted to communicate with the merchant system via the vehicle detection system; and a mobile device for sending and receiving information, wherein the mobile device is adapted to communicate with the mobile payment extension system of the vehicle.

In some examples, the merchant system comprises a merchant server for management of sales transactions between a customer and a merchant.

In some implementations, the information includes one from the group consisting of sales information, parking information, parking rates, the maximum number of hours allowed to park, discounts, parking tips, a street cleaning schedule, a weather forecast, a visual itemized list of all of the merchant's products ordered by a customer, advertisements, targeted advertisements and nearby businesses.

In some examples, the vehicle detection system comprises a mechanism to detect presence of a component of the vehicle comprising the mobile payment extension system and extract identifying information on an identity of a customer inside the vehicle.

In some implementations, the vehicle detection system communicates with the mobile payment extension system by utilizing near field communication (NFC) compliant devices.

In some examples, the vehicle detection system comprises a vehicular roadway comprising an NFC chip.

In some implementations, the mobile payment extension system comprises a vehicle part comprising an NFC chip.

In some examples, the mobile payment extension system comprises a road contact module, an extension circuitry module and a dashboard module.

In some implementations, the road contact module comprises a near field communication (NFC) chip.

In some examples, the NFC chip comprises information about the vehicle and information about a consumer.

In some implementations, the extension circuitry module is electrically connected to the road contact module and the dashboard module and comprises a computer processor, a memory and software to control and manage communications between the dashboard module and the merchant system.

In some examples, the dashboard module comprises a near field communication (NFC) chip adapted for communication with an NFC-enabled mobile device.

In yet another aspect, a vehicular-based security system includes a vehicle comprising a mobile communication system and a security system operatively connected with an ignition or starter system of the vehicle; and a mobile device for sending and receiving information, wherein the mobile device is adapted to communicate with the mobile communication system of the vehicle, and the mobile communication system is adapted to communicate with the security system.

In some examples, each of the mobile communication system and mobile device is adapted for near field communications (NFC).

In some implementations, the mobile device comprises a system for allowing a user to sign-in to the security system and unlock the vehicle ignition or starter system by engaging NFC between the mobile device and mobile communication system.

In some examples, the mobile communication system comprises an NFC target and wherein the vehicle is started by tapping the mobile device to the target.

In some implementations, the mobile communication system comprises a system for validating a credential of the user stored on the mobile device before unlocking the vehicle ignition or starter system.

In yet another aspect, a method for providing vehicular-based mobile payment includes connecting a vehicle detection system to a merchant system; connecting a mobile payment extension system to a vehicle; sending and receiving information between the merchant system and the vehicle via the vehicle detection system and the mobile payment extension system; and sending and receiving information via a mobile device, wherein the mobile device is adapted to communicate with the mobile payment extension system of the vehicle.

In some examples, the merchant system comprises a merchant server for management of sales transactions between a customer and a merchant.

In some implementations, the information includes one from the group consisting of sales information, parking information, parking rates, the maximum number of hours allowed to park, discounts, parking tips, a street cleaning schedule, a weather forecast, a visual itemized list of all of the merchant's products ordered by a customer, advertisements, targeted advertisements and nearby businesses.

In some examples, the vehicle detection system comprises a mechanism to detect presence of a component of the vehicle comprising the mobile payment extension system and extract identifying information on an identity of a customer inside the vehicle.

In some implementations, the vehicle detection system communicates with the mobile payment extension system by utilizing near field communication (NFC) compliant devices.

In some examples, the vehicle detection system comprises a vehicular roadway comprising an NFC chip.

In some implementations, the mobile payment extension system comprises a vehicle part comprising an NFC chip.

In some examples, the mobile payment extension system comprises a road contact module, an extension circuitry module and a dashboard module.

In some implementations, the road contact module comprises a near field communication (NFC) chip.

In some examples, the NFC chip comprises information about the vehicle and information about a consumer.

In some implementations, the extension circuitry module is electrically connected to the road contact module and the dashboard module and comprises a computer processor, a memory and software to control and manage communications between the dashboard module and the merchant system.

In some examples, the dashboard module comprises a near field communication (NFC) chip adapted for communication with an NFC-enabled mobile device.

In yet another aspect, a method for providing vehicular-based security includes providing a vehicle with a mobile communication system and a security system operatively connected with an ignition or starter system of the vehicle; and providing a mobile device for sending and receiving information, wherein the mobile device is adapted to communicate with the mobile communication system of the vehicle, and the mobile communication system is adapted to communicate with the security system.

In some implementations, each of the mobile communication system and mobile device is adapted for near field communications (NFC).

In some examples, the mobile device comprises a system for allowing a user to sign-in to the security system and unlock the vehicle ignition or starter system by engaging NFC between the mobile device and mobile communication system.

In some implementations, the mobile communication system comprises an NFC target and wherein the vehicle is started by tapping the mobile device to the target.

In some examples, the mobile communication system comprises a system for validating a credential of the user stored on the mobile device before unlocking the vehicle ignition or starter system.

In yet another aspect, a non-transitory computer-readable storage medium storing one or more programs configured to be executed by one or more processing units at a computer includes instructions for connecting a vehicle detection system to a merchant system; connecting a mobile payment extension system to a vehicle; sending and receiving information between the merchant system and the vehicle via the vehicle detection system and the mobile payment extension system; and sending and receiving information via a mobile device, wherein the mobile device is adapted to communicate with the mobile payment extension system of the vehicle.

In yet another aspect, a user interface is adapted for a vehicular-based mobile payment system that includes a merchant system for sending and receiving information; a vehicle detection system connected to the merchant system; a vehicle comprising a mobile payment extension system, wherein the mobile payment extension system is adapted to communicate with the merchant system via the vehicle detection system; and a mobile device for sending and receiving information, wherein the mobile device is adapted to communicate with the mobile payment extension system of the vehicle, wherein a user communicates with the mobile device via the user interface displayed on the mobile device.

In some implementations, the user interface communicates with the mobile payment extension system, which controls information displayed on the user interface.

In some examples, the user interface comprises a system for managing security settings.

In some implementations, the user interface comprises a system for enabling and disabling mobile payment capability.

In some examples, the user interface comprises a system for managing advertising messages.

In some implementations, the user interface comprises a system for managing user profile settings.

In some examples, the user interface comprises a system to support multiple users.

In some implementations, the system to support multiple users comprises a means for personalizing temperature inside the vehicle, a means for personalizing settings of audio equipment, a means for personalizing seat adjustment and positioning, and a means for personalizing a position of a mirror attached to the vehicle.

In some examples, the extension circuitry module comprises a security system operatively connected with an ignition or starter system of the vehicle.

In some implementations, the user interface comprises a system for exchanging information between a merchant and a user of the user interface.

In some examples, the system for exchanging information comprises a TCP/IP communication protocol.

In some implementations, the system for exchanging information comprises a session initiation protocol (SIP).

In some examples, the system for exchanging information allows the user to block or filter specified types of information from the merchant.

In some implementations, the system for exchanging information is adapted to transmit promotional messages from the merchant to the user.

In some examples, the system for exchanging information is adapted to prompt a user to select a product or service offered by the merchant.

In some implementations, the system for exchanging information is adapted to transmit the user's selections of a product or service to the merchant system, to calculate a total payment due to the merchant, to transmit a payment notice to the mobile device via the dashboard module.

In some examples, the system for exchanging information is adapted to transmit targeted information based on information stored in the extension circuitry module.

In some implementations, the information stored in the extension circuitry module comprises at least one of a model of the user's vehicle, a make of the user's vehicle, an age of the user's vehicle, the user's selections of the product or service, a location of the merchant, a date, a time, traffic related information relating to the merchant's location and community or public service messages based on the merchant's location.

In some examples, the targeted information comprises an electronic coupon.

In some implementations, the user interface comprises a system for delivering ad hoc real-time voice communications between a merchant and the user.

In some examples, communication protocols between the mobile device and the merchant server are based on the protocol of SIP.

In some implementations, communication protocols between the mobile device and the merchant server are based on the protocols of TCP/IP.

In some examples, the mobile device and the merchant server are engaged in voice-over-IP communications.

In some implementations, an SIP User Agent (UA) software module is incorporated into the mobile device and the merchant server.

In some examples, the user interface comprises a system for delivering ad hoc real-time video communications between a merchant and the user.

In some implementations, the user interface comprises a system for delivering ad hoc real-time live chat or instant messaging communications between a merchant and the user.

In some examples, the user is prompted to remit payment for goods or services from the merchant before the goods are provided or before the services are rendered.

In some implementations, the user is prompted to remit payment for goods or services from the merchant after the goods are provided or after the services are rendered.

In some examples, the merchant server starts a timer to time the duration of a service, and wherein the user stops the timer by tapping the mobile device to a device inside the user's vehicle that is in communication with the merchant server so as to notify the merchant server of the user's return.

In some implementations, the service is a parking service.

In some examples, payment is made between a merchant and a user by an action of the user.

In some implementations, final payment authorization is performed when the user taps the mobile device on to a device inside the user's vehicle or places the mobile device in close proximity to the device inside the user's vehicle.

In some examples, the user interface comprises a means for filtering unwanted advertising messages.

In some implementations, the user interface comprises a screen layout, a menu bar and icon placement, and wherein the screen layout, the menu bar, and the icon placement are determined by a user's settings and/or by services or products offered by the merchant.

In yet another aspect, provided herein is a method for vehicular-based mobile payment, the method comprising: sending and receiving information via a merchant system; connecting a vehicle detection system to the merchant system; connecting a mobile payment extension system to a vehicle, wherein the mobile payment extension system is adapted to communicate with the merchant system via the vehicle detection system; sending and receiving information via a mobile device, wherein the mobile device is adapted to communicate with the mobile payment extension system of the vehicle; providing a user interface on the mobile device; and displaying information to the user via the user interface.

In some implementations, the user interface communicates with the mobile payment extension system, which controls information displayed on the user interface.

In some examples, the user interface comprises a system for managing security settings.

In some implementations, the user interface comprises a system for enabling and disabling mobile payment capability.

In some examples, the user interface comprises a system for managing advertising messages.

In some implementations, the user interface comprises a system for managing user profile settings.

In some examples, the user interface comprises a system to support multiple users.

In some implementations, the system to support multiple users comprises a means for personalizing temperature inside the vehicle, a means for personalizing settings of audio equipment, a means for personalizing seat adjustment and positioning, and a means for personalizing a position of a mirror attached to the vehicle.

In some implementations, the mobile payment extension system comprises a security system operatively connected with an ignition or starter system of the vehicle.

In some examples, the user interface comprises a system for exchanging information between a merchant and a user of the user interface.

In some implementations, the system for exchanging information comprises a TCP/IP communication protocol.

In some examples, the system for exchanging information comprises a session initiation protocol (SIP).

In some implementations, the system for exchanging information allows the user to block or filter specified types of information from the merchant.

In some examples, the system for exchanging information is adapted to transmit promotional messages from the merchant to the user.

In some implementations, the system for exchanging information is adapted to prompt a user to select a product or service offered by the merchant.

In some examples, the system for exchanging information is adapted to transmit the user's selections of a product or service to the merchant system, to calculate a total payment due to the merchant, to transmit a payment notice to the mobile device via the dashboard module.

In some implementations, the system for exchanging information is adapted to transmit targeted information based on information stored in the extension circuitry module.

In some examples, the information stored in the extension circuitry module comprises at least one of a model of the user's vehicle, a make of the user's vehicle, an age of the user's vehicle, the user's selections of the product or service, a location of the merchant, a date, a time, traffic related information relating to the merchant's location and community or public service messages based on the merchant's location.

In some implementations, the targeted information comprises an electronic coupon.

In some examples, the user interface comprises a system for delivering ad hoc real-time voice communications between a merchant and the user.

In some implementations, communication protocols between the mobile device and the merchant server are based on the protocol of SIP.

In some examples, communication protocols between the mobile device and the merchant server are based on the protocols of TCP/IP.

In some implementations, the mobile device and the merchant server are engaged in voice-over-IP communications.

In some examples, an SIP User Agent (UA) software module is incorporated into the mobile device and the merchant server.

In some implementations, the user interface comprises a system for delivering ad hoc real-time video communications between a merchant and the user.

In some examples, the user interface comprises a system for delivering ad hoc real-time live chat or instant messaging communications between a merchant and the user.

In some implementations, the user is prompted to remit payment for goods or services from the merchant before the goods are provided or before the services are rendered.

In some examples, the user is prompted to remit payment for goods or services from the merchant after the goods are provided or after the services are rendered.

In some implementations, the merchant server starts a timer to time the duration of a service, and wherein the user stops the timer by tapping the mobile device to a device inside the user's vehicle that is in communication with the merchant server so as to notify the merchant server of the user's return.

In some examples, the service is a parking service.

In some implementations, payment is made between a merchant and a user by an action of the user.

In some examples, final payment authorization is performed when the user taps the mobile device on to a device inside the user's vehicle or places the mobile device in close proximity to the device inside the user's vehicle.

In yet another aspect, provided herein is a non-transitory computer-readable storage medium storing one or more programs configured to be executed by one or more processing units at a computer comprising instructions for: sending and receiving information via a merchant system; sending and receiving information between a vehicle detection system and the merchant system; sending and receiving information between a mobile payment extension system and a vehicle, wherein the mobile payment extension system is adapted to communicate with the merchant system via the vehicle detection system; sending and receiving information via a mobile device, wherein the mobile device is adapted to communicate with the mobile payment extension system of the vehicle; providing a user interface on the mobile device; and displaying information to the user via the user interface.

BRIEF DESCRIPTION OF THE DRAWINGS

FIG. 3 illustrates an example of a communication path between the Merchant Server, Merchant Road Detection Circuitry, Road Contact Module, Extension Circuitry Module, Dashboard Module and user's NFC-enabled payment device such as an NFC-enabled Smartphone;

FIG. 3A illustrates an example implementation of VoIP communication between the user's NFC-enabled Smartphone and a Merchant Server using SIP technology;

DETAILED DESCRIPTION

Figure 1:
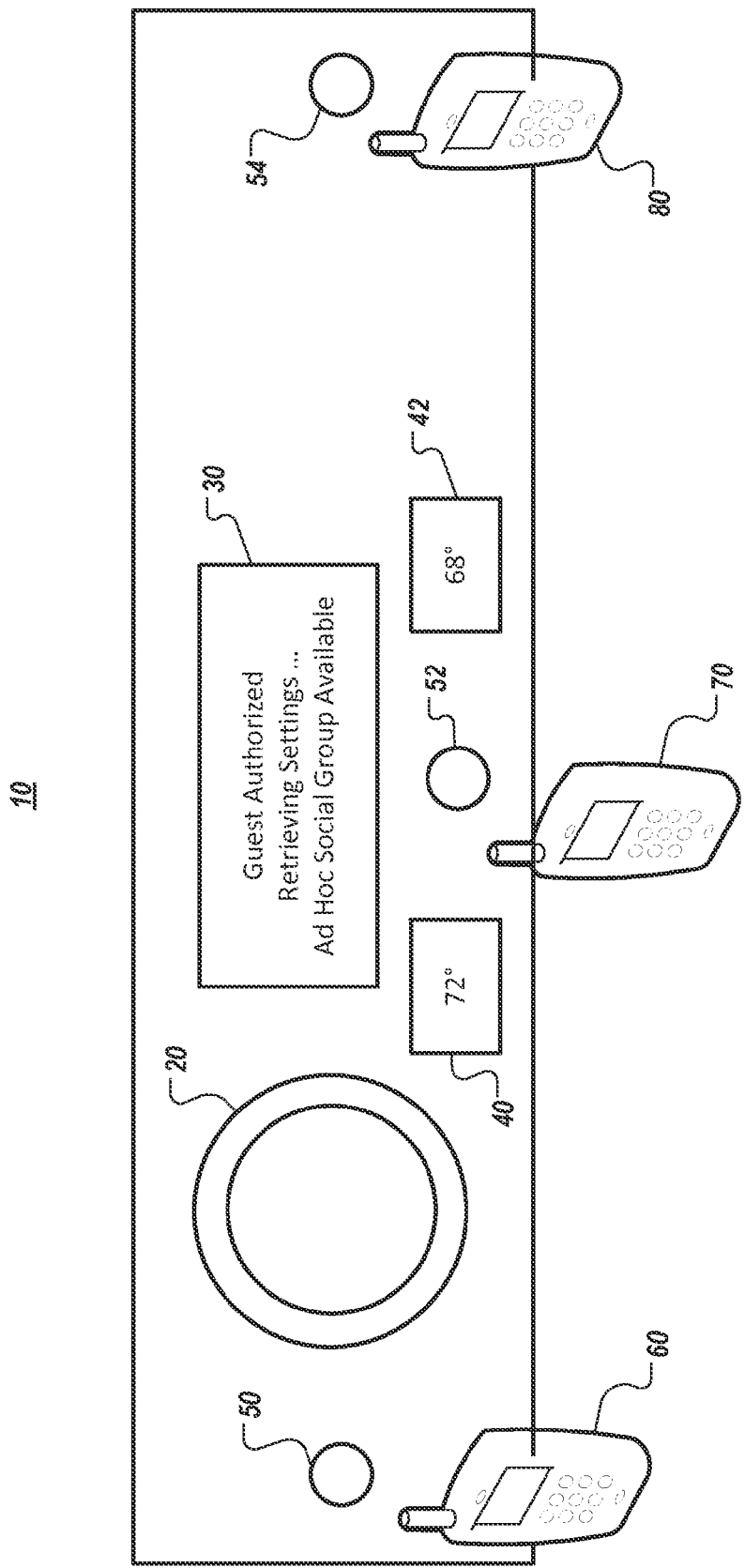
FIG. 1 illustrates an example of a dashboard interface of a vehicle.

Techniques are described for enhancing security, customization, and/or group interaction of users in vehicles. For example, an owner of a vehicle may register his or her mobile device (e.g., smartphone) with circuitry of the vehicle such that the circuitry of the vehicle is able to detect presence of the owner's mobile device for security purposes. In this example, the owner may, using his or her mobile device which is connected to the circuitry of the vehicle through a short-range wireless communication port (e.g., an NFC port), establish rules for using the owner's vehicle and have the rules stored on the circuitry of the vehicle. When the owner of the vehicle wants to authorize a guest to use the vehicle, the owner presents his or her mobile device along with a mobile device (e.g., smartphone) of the guest and authorizes use of the vehicle by the guest. At this point, the guest is registered as an authorized user of the vehicle and the circuitry of the vehicle retrieves, from the guest mobile device over a short-range wireless connection, preferred vehicle settings of the guest user. The circuitry of the vehicle evaluates the preferred settings of the guest against the rules setup by the owner and adapts the vehicle settings to those preferred by the guest user where the evaluation indicates that the rules permit the preferred guest settings. Where the rules do not permit the preferred guest settings (or for settings that have no guest preference), the circuitry of the vehicle uses default vehicle settings defined by the owner. In this regard, security of the vehicle may be enhanced by requiring the owner mobile device to be present to authorize a guest user and by preventing the guest user from implementing settings that are against the desire of the owner. In addition, the convenience of the guest user may be enhanced because his or her preferred settings are automatically retrieved from his or her mobile device and adapted to the vehicle. These types of techniques may be useful in a rental car business where the rental car agent uses a mobile device to provide a renter with authorization to use a rental car and the rental car automatically retrieves the renter's preferred settings from the renter's mobile device and adapts the rental car to settings preferred by the renter where permissible.

In addition, the vehicle may support simultaneous users. For instance, after the guest user has been authorized, a passenger may join the guest user in the vehicle. The circuitry of the vehicle detects a mobile device of the passenger using a short-range wireless transceiver in the vehicle and retrieves the preferred settings of the passenger user through communications exchanged between the short-range wireless transceiver and a short-range wireless communication port on the mobile device of the passenger. The circuitry of the vehicle then evaluates the passenger's preferred settings against the rules established by the owner and the settings preferred by the guest (or driver) user. The circuitry of the vehicle adapts the settings of the vehicle to the passenger's preferred settings where the settings are permissible and not inconsistent with the settings preferred by the guest (or driver) user. As one example, the passenger's preferred settings may include a temperature setting. In this example, the circuitry of the vehicle automatically applies the temperature setting based on a determination that the temperature setting is permitted by the owner's rules and the guest (or driver) user has no preference for temperature defined. However, if the guest (or driver) user has a preference for temperature defined that is inconsistent with the temperature setting preferred by the passenger, then the circuitry of the vehicle rejects the passenger's temperature setting or applies it to only passenger side controls if the vehicle has separate driver and passenger temperature settings.

When rejecting a setting, the vehicle may make a recommendation or automatically adjust another setting for the passenger to help compensate for the rejection of the setting. For instance, when the passenger temperature setting is rejected because it is higher than the guest (or driver) user's preference, the circuitry of the vehicle may send the mobile device of the passenger a recommendation to turn on a seat heater (which the passenger user may activate through his or her mobile device or another control in the vehicle) or may automatically turn on the seat heater to help enhance the passenger's convenience due to the lower than preferred temperature setting. Using these techniques, the electronic circuitry of the vehicle interacts with multiple users simultaneously and attempts to adapt the vehicle settings to best meet the preferences of all simultaneous users of the vehicle.

Further, the electronic circuitry of the vehicle may support ad hoc social groups that facilitate interaction between users with vehicles located in the same general location. As described throughout this disclosure, vehicles include road contact transceivers that enable the vehicles to communicate with in-pavement vehicle detection systems. In some implementations, an in-pavement vehicle detection system may have multiple points that enable a vehicle to connect to the in-pavement vehicle detection system. For example, an in-pavement vehicle detection system for a parking lot or parking garage may have a point of connection at each space in the lot or garage. In this example, as vehicles move into and out of the parking spaces, a dynamic social group of users currently parked in the lot or garage may automatically form and enable communications (e.g., text, video, voice, etc.) between members in the group. The group is limited to those mobile devices associated with vehicles that are presently parked in the lot or garage and connected to the in-pavement vehicle detection system and one or more merchant operators associated with the in-pavement vehicle detection system. In addition, because the mobile devices may be used merely as input/output devices, the communications of the group may flow through the in-pavement vehicle detection system without revealing communication information of any of the mobile devices participating, which helps protect privacy of users participating in the ad hoc social group. In this regard, the only information perceived by other members of the group may be an identifier for the vehicle or the identifier for the parking space where the vehicle is parked or even just an arbitrary identifier assigned as vehicles connect to the group (which may preserve identification and location privacy, but still confirm the communication is with a vehicle presently located in the lot or garage). By forming ad hoc social groups of vehicles located in the same area, interaction between users in nearby vehicles may be enhanced. For instance, a user parked in a parking garage may inform other users parked in the garage of a dangerous situation (e.g., that a stairway is wet) or that the user is leaving with time remaining on his or her meter, which could help save another user just joining the group money by moving his or her car to that space. When the in-pavement vehicle detection system is located in a parking lot at a rest stop, travelers may interact with one another to share traffic information, interesting experiences in their travels, and/or exchange any information that may be useful for travelling or that may help drivers with similar interests connect. In the rental car scenario, an ad hoc social group may form with renters that just rented cars from the same agency and may enable the renters to identify other people travelling to the same location and coordinate their travel (e.g., a renter that is very familiar with the area may offer to lead another renter that is unfamiliar with the area to their common destination).

FIG. 1 illustrates an example of a dashboard interface 10 of a vehicle. The dashboard interface 10 may be used in implementing the above-described techniques for enhancing security, customization, and/or group interaction of users in vehicles. The dashboard interface 10 includes a steering wheel 20, an interactive display 30, a driver temperature setting control 40, a passenger temperature setting control 42, and three wireless transceivers 50, 52, and 54. The steering wheel 20 is used to steer the vehicle that includes the dashboard interface 10. The interactive display 30 displays information related to operation and/or settings of the vehicle and is capable of receiving user input that controls operations and/or settings of the vehicle. For instance, the interactive display 30 may be a touch screen display that is configured to receive touch input. In some implementations, the display 30 may not be used and information shown as being displayed on the display 30 may be displayed on a user's mobile device. The driver temperature setting control 40 displays a temperature setting for a driver side of the passenger compartment of the vehicle and is capable of receiving input to change the driver temperature setting. The passenger temperature setting control 42 displays a temperature setting for a passenger side of the passenger compartment of the vehicle and is capable of receiving input to change the passenger temperature setting.

The wireless transceivers 50, 52, and 54 are configured to receive short-range wireless communications from mobile devices located nearby and transmit short-range wireless communications to mobile devices located nearby. The wireless transceivers 50, 52, and 54 may be any type of wireless transceiver described throughout this disclosure and may include NFC transceivers that receive and transmit signals in accordance with the NFC protocol. The wireless transceiver 50 is designated as a security transceiver configured to interact with a mobile device that authorizes usage of the vehicle, the wireless transceiver 52 is designated as a driver transceiver configured to interact with a mobile device of a driver in the vehicle, and the wireless transceiver 54 is designated as a passenger transceiver configured to interact with a mobile device of a passenger in the vehicle. Although the wireless transceivers 50, 52, and 54 are shown as being located in the dashboard of the vehicle, the wireless transceivers 50, 52, and 54 may be positioned at other locations of the vehicle (e.g., in a center console of the vehicle). In addition, the vehicle may include more or fewer wireless transceivers (e.g., additional transceivers for passengers in the backseat of the vehicle or a single wireless transceiver that is configured to communicate with mobile devices throughout the passenger compartment and distinguish among all of the devices present).

As shown, an owner mobile device 60 (e.g., a smartphone) is positioned nearby the wireless transceiver 50 and establishes a short-range wireless connection with the wireless transceiver 50 such that the owner mobile device 60 is able to exchange communications with electronic circuitry that controls the vehicle and dashboard interface 10. A guest mobile device 70 (e.g., a smartphone) is positioned nearby the wireless transceiver 52 and establishes a short-range wireless connection with the wireless transceiver 52 such that the guest mobile device 70 is able to exchange communications with electronic circuitry that controls the vehicle and dashboard interface 10. A passenger mobile device 80 (e.g., a smartphone) is positioned nearby the wireless transceiver 54 and establishes a short-range wireless connection with the wireless transceiver 54 such that the passenger mobile device 80 is able to exchange communications with electronic circuitry that controls the vehicle and dashboard interface 10. Although the mobile devices 60, 70, and 80 are illustrated as being simultaneously connected to the wireless transceivers 50, 52, and 54, the mobile devices 60, 70, and 80 may sequentially connect to the wireless transceivers 50, 52, and 54 and need not be continuously connected to the wireless transceivers 50, 52, and 54 for their presence to be taken into account.

In this example, the owner mobile device 60 connects to the wireless transceiver 50 designated as the security transceiver. The security transceiver is designed to receive communications that activate the vehicle. For instance, when the owner of the vehicle purchases the vehicle, the owner registers one or more mobile devices with the wireless transceiver 50. The registration may require the owner to present a key to an interface of the dashboard in addition to tapping the device being registered to the wireless transceiver 50. The key is used to confirm that the person registering the owner mobile device is actually authorized to perform the registration. Upon registration, the circuitry of the vehicle stores identifying information for the one or more owner mobile devices for later identification. In the example shown in FIG. 1, the owner mobile device 60 was previously registered with the vehicle and the circuitry of the vehicle recognizes the owner mobile device 60 by comparing identification information received through the wireless transceiver 50 from the owner mobile device 60 with identifying information stored for registered devices.

Based on recognition of the owner mobile device 60, the circuitry of the vehicle activates the vehicle for use. For example, the circuitry of the vehicle begins monitoring for mobile devices in proximity to the wireless transceiver 52 and the wireless transceiver 54. In this example, the guest mobile device 70 connects through the wireless transceiver 52 and the passenger mobile device 80 connects through the wireless transceiver 54. As mentioned above, the passenger mobile device 80 may connect through the wireless transceiver 54 after the guest mobile device 70 connects through the wireless transceiver 52.

Based on the guest mobile device 70 connecting through the wireless transceiver 52, the circuitry of the vehicle detects the guest mobile device 70 as the driver, receives identifying information from the guest mobile device 70, and compares the identifying information to known drivers of the vehicle (e.g., the one or more owner mobile devices). Based on the comparison, the circuitry of the vehicle determines that the guest mobile device 70 is not a known driver and treats the guest mobile device 70 a guest driver. In this regard, the circuitry requires authorization of an owner mobile device to allow the guest driver to operate the vehicle. The authorization may require that the owner mobile device 60 be connected to the wireless transceiver 50 simultaneously with the guest mobile device 70 being connected to the wireless transceiver 52.

In some implementations, the circuitry of the vehicle may solicit user input from the owner mobile device 60 to confirm authorization. In these implementations, the user input may specify parameters of use of the vehicle allowed by the guest user, such as the amount of time the guest user is allowed to operate the vehicle.

Based on authorization from the owner mobile device 60, the circuitry of the vehicle registers the guest user as a driver. The registration may be temporary (e.g., limited to a threshold period of time, such as one hour, one day, one week, etc.) and may or may not allow the guest user to activate the vehicle and begin driving without the presence of the owner mobile device 60. In this regard, the owner retains control over the vehicle and may be provided with enhanced security over the operation of his or her vehicle.

In addition, upon registration of the guest mobile device 70, the circuitry requests, through the wireless transceiver 52, preferred vehicle settings (if any) stored on the guest mobile device 70. In this example, the guest mobile device 70 accesses preferred vehicle settings for the guest from its electronic storage and transmits the accessed settings to the wireless transceiver 52. The preferred vehicle settings may include settings related to use and comfort of the vehicle (e.g., temperature settings, seat position settings, mirror settings, audio system settings, navigation system settings, etc.) and settings related to electronic communications exchanged with other devices through the dashboard interface (e.g., settings that indicate whether the user would like to participate in ad hoc social groups, limitations on the types of information provided to other devices through the dashboard interface, etc.).

Also, after, or concurrent with, registration of the guest mobile device 70, the circuitry of the vehicle detects a connection established between the wireless transceiver 54 and the passenger mobile device 80. Based on detection of the passenger mobile device 80, the circuitry requests, through the wireless transceiver 54, preferred vehicle settings (if any) stored on the passenger mobile device 80. In this example, the passenger mobile device 80 accesses preferred vehicle settings for the passenger from its electronic storage and transmits the accessed settings to the wireless transceiver 54. The preferred vehicle settings may include settings related to use and comfort of the vehicle (e.g., temperature settings, seat position settings, mirror settings, audio system settings, navigation system settings, etc.) and settings related to electronic communications exchanged with other devices through the dashboard interface (e.g., settings that indicate whether the user would like to participate in ad hoc social groups, limitations on the types of information provided to other devices through the dashboard interface, etc.).

Now that the circuitry has received the guest vehicle settings and the passenger vehicle settings, the circuitry accesses rules setup by the owner of the vehicle that define the permissible settings of the vehicle. The permissible settings may include specific values and/or ranges of values for vehicle convenience settings. For instance, the rules may define that the temperature setting must be between sixty-six degrees and seventy-six degrees to avoid extreme temperature settings of guest users. Also, the rules may define parameters for communicating with external devices through road contact transceivers of the vehicle. For example, the rules may define that vehicle information should not be shared when the vehicle is used in participating in an ad hoc social group.

The circuitry then evaluates the accessed owner rules with respect to the guest vehicle settings received from the guest mobile device 70 and the passenger vehicle settings received from the passenger mobile device 80 and attempts to automatically customize the vehicle to the preferred settings of the guest and passenger within the constraints defined by the owner rules. For instance, the circuitry determines whether any of the guest or passenger settings do not comply with the rules and either discards the non-complying settings or adjusts them to the closest possible value that does comply with the rules. For guest or passenger settings that are not possible for the vehicle, the circuitry either discards the impossible settings or adjusts similar settings that the vehicle includes in a manner that best matches the impossible settings. For settings of the vehicle where the guest and passenger do not have a preference, the circuitry automatically sets these settings to default values defined by the rules.

Based on the evaluation of the owner rules with respect to the guest and passenger vehicle settings, the circuitry arrives at a list of permissible settings that meet the preferences of the guest and the passenger. From this list of settings, the circuitry determines whether any of the preferred settings of the guest user conflict with the preferred settings of the passenger user. If none of the preferred settings of the guest user conflict with the preferred settings of the passenger user, the circuitry adopts all of the settings in the list and automatically adjusts vehicle settings to match the list of settings. However, if at least one of the preferred settings of the guest user conflicts with at least one of the preferred settings of the passenger user, the circuitry performs additional processing to determine how best to customize the vehicle to meet the preferences of the guest user and the preferences of the passenger user. For example, the circuitry may determine whether separate driver and passenger settings exist for any of the preferred settings in conflict. In this example, when different driver and passenger settings exist, the circuitry applies the preferred guest setting to the driver setting and the preferred passenger setting to the preferred passenger setting. As shown in FIG. 1, the vehicle includes the driver temperature setting control 40 and the passenger temperature setting control 42. In this case, the preferred guest setting and the preferred passenger setting fall within the permissible range, but are different from one another. Accordingly, the circuitry of the vehicle applies the preferred guest setting to the driver temperature setting control 40 and applies the preferred passenger setting to the passenger temperature setting control 42.

In some examples, different driver and passenger settings do not exist and the circuitry must come to a compromise when a preferred guest setting does not match a preferred passenger setting. In these examples, the circuitry may select either the guest or the passenger and apply the setting of the selected user. The selection may always be for the guest (or driver), may always be for the passenger, or may vary depending on the setting at issue and the profiles of the guest and passenger. In addition, the circuitry may attempt to perform a compromise between the preferred guest setting and the preferred passenger setting. For instance, when a temperature setting conflicts, the circuitry may average the values of the preferred guest setting and the preferred passenger setting and use the average as the automated setting for the vehicle. As another example, when preferred radio presets differ for the guest and the passenger, the circuitry may select half of the available presets as the top selections of the guest and select the other half of the available presets as the top selections of the passenger.

In addition to customizing the vehicle based on preferred settings received from the guest mobile device 70 and the passenger mobile device 80, the circuitry enables the guest mobile device 70 and the passenger mobile device 80 to participate in ad hoc social groups with other vehicles that are connected to the same in-pavement vehicle detection system as the vehicle. For instance, when the vehicle moves to a position where one or more road contact transceivers of the vehicle are in position to communicate with an in-pavement vehicle detection system, the circuitry of the vehicle performs processing related to participating in an ad hoc social group associated with the in-pavement vehicle detection system. The processing used to participate in the ad hoc social group may take several forms.

In some implementations, the in-pavement vehicle detection system (or a server connected to the in-pavement vehicle detection system) manages the ad hoc social group. In these implementations, the in-pavement vehicle detection system detects vehicles connected to the in-pavement vehicle detection system and handles communications among the vehicles participating in the ad hoc social group. For example, when the in-pavement vehicle detection system detects a new vehicle connection, the in-pavement vehicle detection system sends a communication to the new vehicle to indicate that an ad hoc social group is available and negotiates with the circuitry of the new vehicle to determine whether the new vehicle wishes to participate in the ad hoc social group. The determination of whether the vehicle wishes to participate in the ad hoc social group may be made automatically based on the settings established for the vehicle or may request input from one of the mobile devices. Based on a determination that the vehicle does not wish to participate in the ad hoc social group, the in-pavement vehicle detection system excludes the vehicle from the ad hoc social group and does not route any communication related to the ad hoc social group to the vehicle. Based on a determination that the vehicle does wish to participate in the ad hoc social group, the in-pavement vehicle detection system adds the vehicle to the ad hoc social group, routes, to the vehicle, communications from other vehicles related to the ad hoc social group, and distributes communication from the vehicle to the other vehicles participating in the ad hoc social group.

In some examples, the vehicles maintain and manage the ad hoc social group. In these examples, when a new vehicle connects to the in-pavement vehicle detection system and wishes to participate in an ad hoc social group, the new vehicle broadcasts its joining of the network and desire to participate in the ad hoc social group. Other vehicles receive the broadcast from the new vehicle, add the new vehicle to a list of vehicles participating in the ad hoc social group and send information back to the new vehicle to enable the new vehicle to recognize the other vehicles as part of the ad hoc social group and build its own list of participants in the ad hoc social group. The vehicles then exchange communications directly to one another in participating in the ad hoc social group. The vehicles may use pinging communications and/or acknowledgements to maintain a current list of participants in the ad hoc social group since the participants dynamically change based on vehicles coming and going. By managing the ad hoc social group without involvement of the in-pavement vehicle detection system, the cost of maintaining the in-pavement vehicle detection system may be reduced because the in-pavement vehicle detection system need only be able to facilitate communications between the vehicles, rather than performing processing to manage ad hoc social groups. In this regard, the in-pavement vehicle detection system only needs to maintain equipment that enables communications between the vehicles connected to the in-pavement vehicle detection system and does not need to maintain equipment to manage or participate in the ad hoc social group. For instance, a municipality may wish to enable visitors to a public park to establish an ad hoc social group in the parking lot of the park, but does not wish to incur the cost of managing the ad hoc social group or having an operator available to participate in the ad hoc social group.

In addition, multiple ad hoc social groups may be formed within a parking lot and each such ad hoc social group may be initiated/created by a particular vehicle without participation or authorization by a merchant operator. Also, a vehicle may belong to multiple ad hoc social groups at the same time.

The types of information shared among members participating in the ad hoc social group may vary depending on the preferences of the users currently operating the vehicle and/or the owner of the vehicle. For example, the owner of the vehicle may wish to preserve privacy of vehicle information and may establish a rule that no vehicle information may be shared in ad hoc social groups. In this example, when the vehicle connects to an ad hoc social group, the circuitry of the vehicle withholds identifying information related to the vehicle and only broadcasts its connection point to the in-pavement vehicle detection and/or information about one or more mobile devices that are participating in the ad hoc social group through the vehicle. However, if the owner allows vehicle information to be shared with ad hoc social groups, the circuitry of the vehicle may broadcast vehicle information, such as make, model, color, license plate, etc., to other vehicles participating in the ad hoc social group.

In addition, the one or more mobile devices may control whether mobile device/user information is shared in ad hoc social groups. For instance, the settings of the mobile device may indicate whether to share any information about the mobile device (or the user of the mobile device) with ad hoc social groups. When the settings do not permit sharing of mobile device/user information, the circuitry of the vehicle does not transmit any mobile device/user information to the ad hoc social group and the vehicle is identified in the ad hoc social group by its connection point to the in-pavement vehicle detection system, its vehicle information, and/or an arbitrary identifier assigned to participants in the ad hoc social group. When the settings permit sharing of mobile device/user information, the circuitry of the vehicle transmits mobile device/user information to the ad hoc social group. The mobile device/user information may include a telephone number of the mobile device, a name of the user, profile information for the user, and/or any other information designated by the user for transmission to ad hoc social groups. The profile information for the user may include a profile specifically defined for use in ad hoc social groups for the vehicle or may be a public profile the user uses for another social networking platform. When the profile is a public profile the user uses for another social networking platform, the user may establish connections in the other social networking platform through participation in an ad hoc social group (e.g., meet another user in an ad hoc social group and establish a connection in the other social networking platform through communications exchanged through the in-pavement vehicle detection system as part of participation in the ad hoc social group). The user may define what type of mobile device/user information to share in ad hoc social groups, which may vary depending on the type of in-pavement vehicle detection system to which the vehicle is connected.

In some implementations, multiple mobile devices may be connected to circuitry in a vehicle simultaneously. In these implementations, all of the mobile devices may participate in an ad hoc social group or a subset (e.g., one) of the mobile devices may participate in the ad hoc social network. For example, the circuitry of the vehicle may require that only one mobile device participate in the ad hoc social group and may select the one mobile device to participate based on the settings retrieved from the mobile devices and/or the rules established by the owner of the vehicle. In this example, the settings retrieved from each mobile device may indicate whether or not the device would like to participate in ad hoc social groups. When the settings indicate that only one mobile device would like to participate in ad hoc social groups, the circuitry of the vehicle selects that device as the device to participate in ad hoc social groups. When the settings indicate that multiple mobile devices would like to participate in ad hoc social groups, the circuitry selects the device based on the rules established by the owner, which may result in selection of a driver device, a device having the highest priority of the multiple mobile devices, or the mobile device that first established a connection with the circuitry of the vehicle.

In addition, the selection of the device to participate in an ad hoc social group may vary depending on the type of ad hoc social group. For example, the settings retrieved from the mobile devices may identify an ordered list of ad hoc social groups in which the users would like to participate and the electronic circuitry of the vehicle may use the retrieved ordered lists to select which device to use based on a type of ad hoc social group to which the vehicle is connecting. In this example, the circuitry of the vehicle may determine the type of ad hoc social group to which the vehicle is connecting, compare the determined type to the ordered lists retrieved from mobile devices in the vehicle, and select the device that has the determined type of ad hoc social group ranked highest. For instance, a father user and a son user may be located in the passenger compartment of the vehicle, the circuitry may use the son's mobile device to participate in an ad hoc social group of students parked in a school parking lot, and the circuitry may use the father's mobile device to participate in an ad hoc social group of vehicles parked in a public parking garage.

In implementations in which multiple mobile devices within one vehicle participate in ad hoc social groups, the circuitry in the vehicle may handle participation in ad hoc social groups in various ways. For instance, the circuitry in the vehicle may vary how other members of the ad hoc social group perceive the multiple mobile devices within the one vehicle. As one example, the circuitry may present the multiple mobile devices as simply the vehicle such that the other members of the ad hoc social group do not perceive a distinction between which of the multiple mobile device sends a communication to the ad hoc social group. In this example, the interface for the ad hoc social group may display each member of the social group simply as a vehicle and messages exchanged in the ad hoc social group always appear to originate from a vehicle without regard for which of the multiple mobile devices was used to send the message. In addition, all of the messages for the vehicle exchanged in the ad hoc social group are sent and presented to all of the multiple mobile devices in the vehicle. In this regard, other members of the group may send entire group messages that are distributed to all members of the group or may send a private message that is specific to the vehicle. In either case, the group or private message gets sent and displayed at all of the multiple mobile devices in the vehicle because the circuitry does not distinguish the multiple mobile devices in the ad hoc social group.

In another example, the circuitry may present the multiple mobile devices as devices in the vehicle such that the other members of the ad hoc social group perceive a distinction between which of the multiple mobile device sends a communication to the ad hoc social group. In this example, the interface for the ad hoc social group may display each member of the social group simply as a vehicle and the devices that are located within the vehicle and that are participating in the ad hoc social group. In this case, messages exchanged in the ad hoc social group appear to originate from a device within a vehicle such that other members can identify which device actually sent the message from the vehicle. In addition, messages exchanged in the ad hoc social group may be sent and presented to all of the multiple mobile devices in the vehicle or may be sent and presented to a subset of the multiple mobile devices in the vehicle. In this regard, other members of the group may send entire group messages that are distributed to all members of the group or may send a private message that is specific to the vehicle or specific to a mobile device within the vehicle. In the case of a group message or a private message addressed to the vehicle, the message gets sent and displayed at all of the multiple mobile devices in the vehicle. However, in the case of a private message addressed to a mobile device in the vehicle, the message gets sent and displayed to only the mobile device in to which the message was addressed.

Further, in some examples, the circuitry of the vehicle generates different interfaces for different ad hoc social groups to which the vehicle connects. In these examples, as the vehicle is driven around and connects to different ad hoc social groups, the circuitry generates an interface that is appropriate for the ad hoc social group to which the vehicle is presently connected. For instance, the capabilities of the different in-pavement vehicle detection systems that support the different ad hoc social groups may vary and the circuitry may adapt the interface presented based on the capabilities. In this regard, the circuitry may determine that a first in-vehicle detection system includes text, voice, and video communication capabilities and adapt an interface to interact with a first ad hoc social group of the first in-vehicle detection system to include text, voice, and video communication components. In addition, the circuitry may determine that a second in-vehicle detection system only includes text communication capabilities and adapt an interface to interact with a second ad hoc social group of the second in-vehicle detection system to only include text communication components. Also, the circuitry may adapt the layout, interface content, and flow of interface screens depending on the type of ad hoc social group to which the vehicle connects. For example, the circuitry may store default interface visual and flow characteristics that are preset for different types of ad hoc social groups and select the interface visual and flow characteristics preset for the particular type of ad hoc social group to which the vehicle is presently connected. In another example, the circuitry may receive interface visual and flow characteristics from the in-pavement vehicle detection system that supports the ad hoc social group and use the received interface visual and flow characteristics to adapt the one or more interfaces used to interact in the ad hoc social group.

Vehicle Detection

A first communicant, e.g., a merchant, is provided a mechanism to detect the presence of the vehicle of a second communicant, e.g., a paying customer, and extract identifying information on the identity of the customer, for example, from an information processing system, which can be provided in the customer's vehicle or a customer's mobile communication device. In one embodiment, one or multiple grooves are cut on the pavement (such as in a merchant's parking lot or curb side of a street) and Merchant Road Detection Circuitry is embedded in the surface of the pavement. Although any suitable short-range wireless technology may be used, in one embodiment, NFC technology can be employed. In addition, the Merchant Road Detection Circuitry may include any suitable vehicle sensor system including, for example, inductive-loop detectors, magnetometers and the like.

Even though some embodiments of the present invention utilize NFC technology due to its nature of extremely short-range and secure communication, this invention is by no means limited to the use of NFC. Other forms of short-range communication include, for example, dedicated short-range communication (DSRC), IEEE 802.11, Wi-Fi, Bluetooth, RFID and the like.

Figure 2:
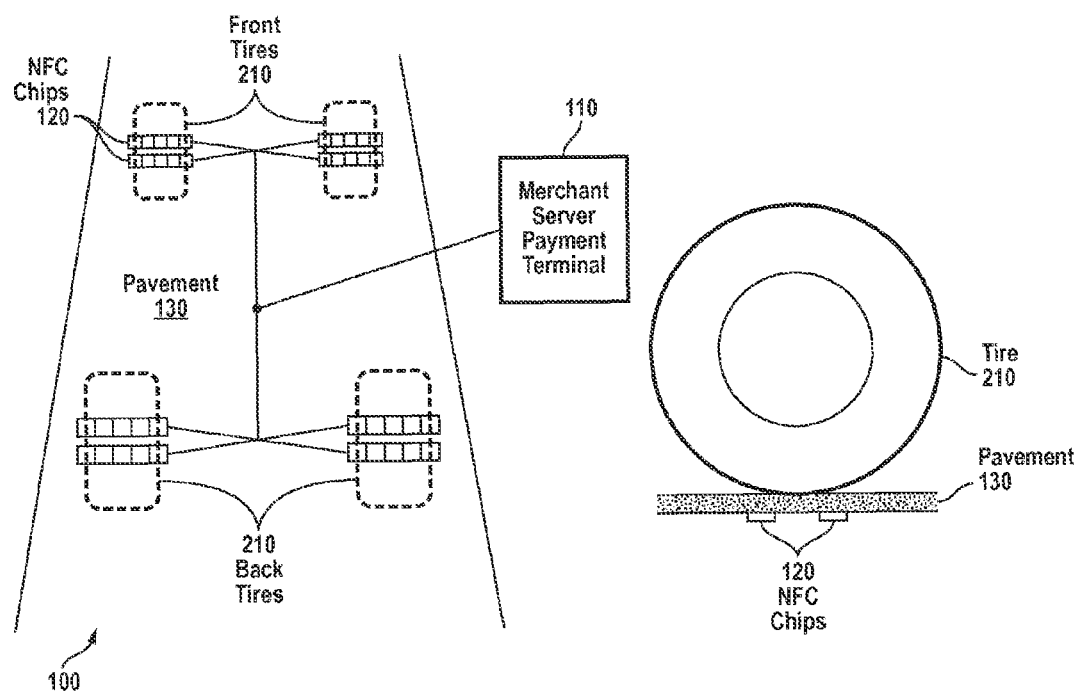
FIG. 2 depicts an embodiment for a merchant to deploy Merchant Road Detection Circuitry embedded on a surface of a road or a parking lot.

In one embodiment, Merchant NFC Road Detection Circuitry 100 is connected to the central server of the merchant (Merchant Server 110) where sales transactions are managed. FIG. 2 depicts an embodiment for a merchant to deploy Merchant Road Detection Circuitry 100 embedded on the surface of a road or a parking lot 130. In FIG. 2, two NFC chips 120 are deployed to detect one tire 210 of a motor vehicle 200 (see FIG. 2A) as an illustration. All four tires 210 of a motor vehicle 200 can be detected as depicted in FIG. 2; however, just one successful detection by any one NFC chip 120 from the NFC Road Detection Circuitry 100 for any one tire would be sufficient for the purpose of completing vehicle identification.

The Merchant Road Detection Circuitry 100 may contain one or more NFC chips 120 capable of detecting an incoming NFC device, such as another NFC chip mounted on the tire 210, rim or body of an approaching vehicle 200. The actual placement of the NFC chip(s) 120 in the Merchant Road Detection Circuitry 100 and the distance between each NFC chip can vary depending on factors such as the size of the road (or parking lot), speed of approaching vehicles, the types of motor vehicles anticipated and environmental factors. A variety of geometric placements (e.g., linear stripes, circular patterns, etc.) of NFC chips 120 on a Merchant Road Detection Circuitry 100 may be possible. The NFC technology allows detection of one NFC device from another NFC device within 100 msec.

When Merchant Road Detection Circuitry 100 positively detects the presence of a motor vehicle 200, the Circuitry 100, through its onboard NFC chip 120, communicates with the NFC chip mounted on the motor vehicle 200 to establish two-way communication using established NFC communication protocols. The identity of the motor vehicle 200, encoded in the NFC chip mounted on the motor vehicle 200, can be communicated to the Merchant Server 110. The identity of the merchant, encoded in the NFC chips on the Merchant Road Detection Circuitry 100, can be communicated to the customer's motor vehicle 200 and eventually to the customer's NFC-enabled Smartphone 340 (see FIG. 3 or 3A).

The purpose of the Merchant Road Detection Circuitry is to ensure an active NFC connection between a Road Contact Module in at least one tire of a customer's vehicle and the Merchant server when the customer's vehicle is parked in a designated parking spot of the merchant. As such, the Merchant Road Detection Circuitry can take on a large variety of geometric shapes and areas (linear, circular, etc.) and redundancies in order to ensure fast and reliable contact between the customer's vehicle and the merchant server where sales transactions are to be made. Due to the low cost of the NFC chips, a relatively large surface area containing a large array of NFC chips may be financially feasible for deployment as part of the Merchant Road Detection Circuitry installation. This invention does not favor or rely on any particular layout of the Merchant Road Detection Circuitry.

The NFC chips in a Merchant Road Detection Circuitry may be encapsulated in hard plastic casings and mounted on the surface of the pavement of the merchant's parking lot. Because NFC is based on radio frequency (RF) technology which is capable of penetrating plastics, concrete materials, etc. and can operate in a variety of outdoor environments, the physical implementation of the Merchant Road Detection Circuitry may take on a variety of form factors to embed NFC chips into the surface of the pavement. This invention does not favor or rely on any particular implementation of the Merchant Road Detection Circuitry.

Road Contact Module Mounting and Installation

Each Road Contact Module can contain one or more NFC chips and may be encapsulated in a plastic casing of a variety of shapes for ease of handling. A Road Contact Module can be installed either in the stem valve of a tire or mounted on the rim of the wheel. The installation procedure can be similar to the standard installation procedure of a sensor in a Tire Pressure Monitoring System (TPMS).

Figure 7:
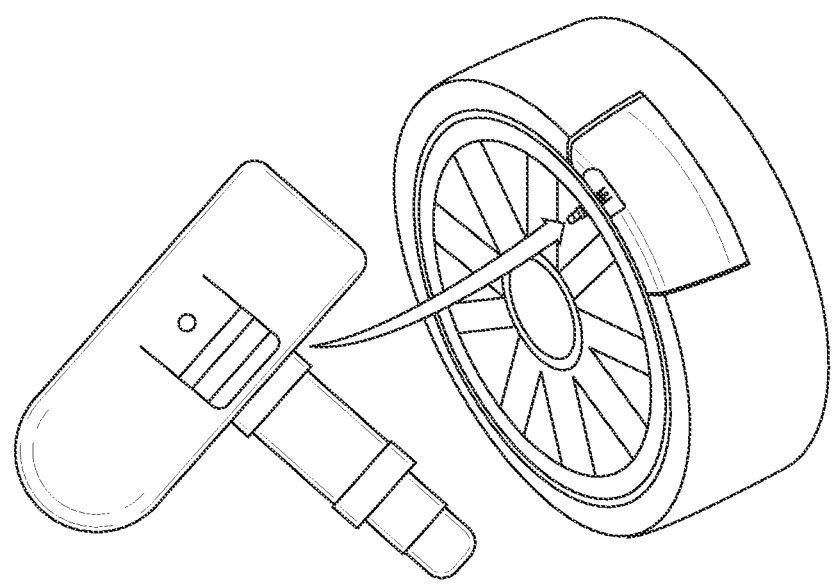
FIG. 7 depicts an example of a valve-mounted Road Contact Module.
Figure 8:
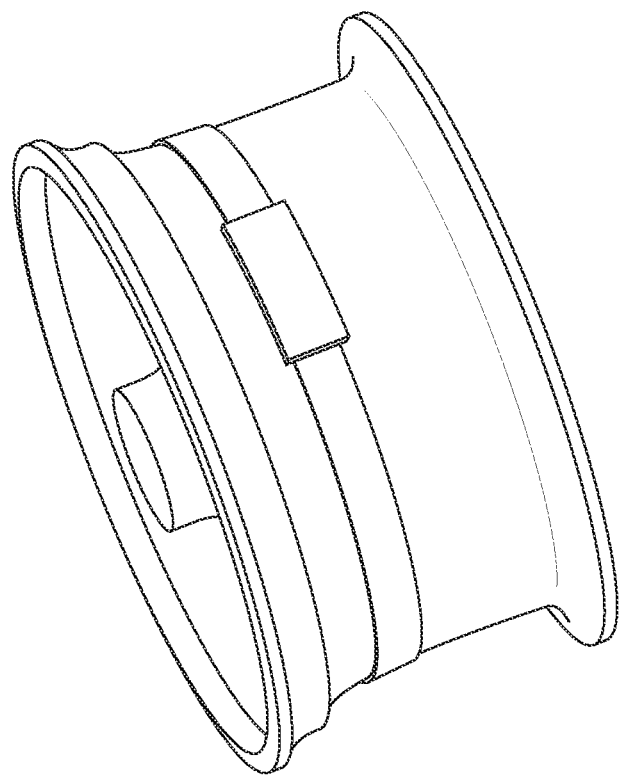
FIG. 8 depicts an example of a band-mounted Road Contact Module.

FIGS. 7 and 8 illustrate examples of installation processes for application of a device such as a Road Contact Module to a rim or tire of a vehicle. FIG. 7 depicts an example of a valve-mounted device, which may be a sensor, an NFC chip, circuitry, housings, support modules or a Road Contact Module. FIG. 8 depicts an example of a band-mounted device. FIG. 7 depicts a design where the installation of a Road Contact Module is on the stem valve of the tire. The advantage of this design is ease of installation as the tire does not have to be dismounted from the wheel to perform the installation. The disadvantage of this design is that there can only be one Road Contact Module for each tire, hence increasing the likelihood of the Road Contact Module on the tire not making contact with the Merchant Road Detection Circuitry. FIG. 8 depicts another design where a Road Contact Module is mounted through a band onto the wheel of the vehicle. The disadvantage of this design is the necessity of having to remove the tire from the wheel before installation can take place. The advantage of this design is that multiple Road Contact Modules can be mounted along the entire circumference of the wheel.

Figure 6:
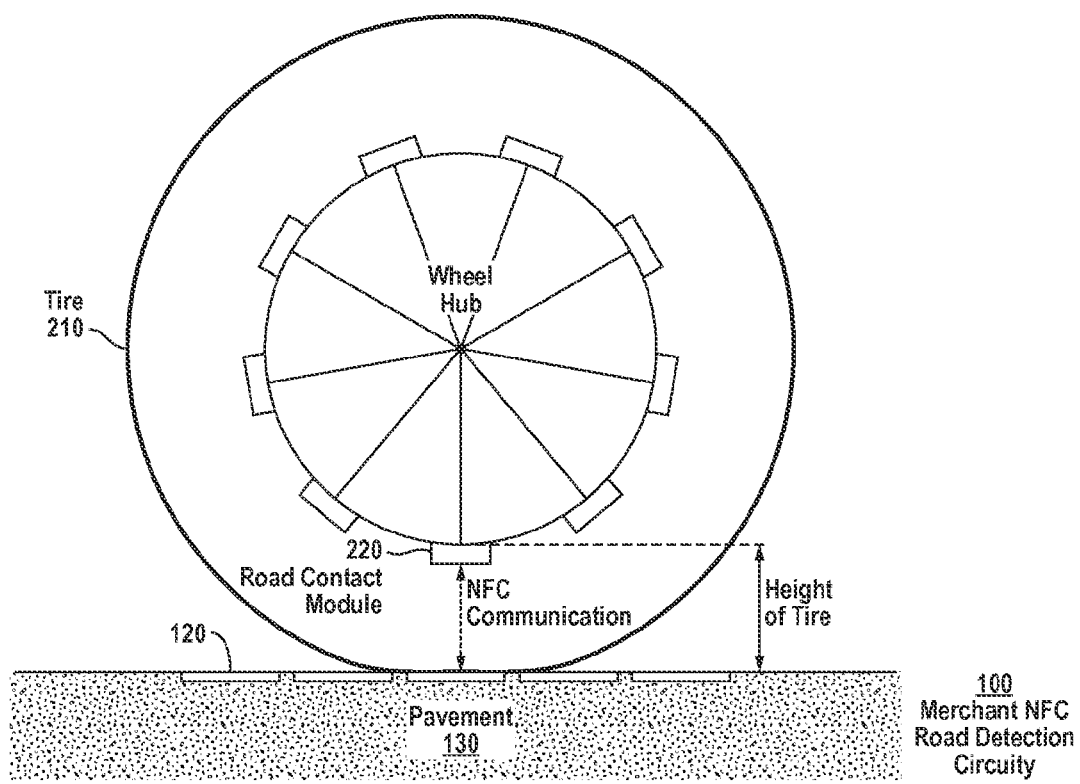
FIG. 6 depicts an example of the Road Contact Module provided so as to proportionally protrude into a space between an edge of a wheel and a tire.

For the purpose of this invention, the design depicted in FIG. 8 is preferred because it allows a greater number of Road Contact Modules to be mounted along the perimeter of the wheel to ensure contact with at least one NFC chip embedded in the Merchant Road Detection Circuitry. Further, the Road Contact Module is physically designed to proportionally protrude more into the space between the edge of the wheel and the tire (depending on the height of the tire) so as to ensure the distance between the NFC chip in the Road Contact Module and the NFC chip in the Merchant Road Detection Circuitry meet the distance range limitation required by the NFC protocol. See FIG. 6 for an illustration. The actual implementation such as the number of Road Contact Modules required on the circumference of a wheel, the physical placement of each Road Contact Module along the circumference of the wheel and the placement of NFC chips in the Merchant Road Detection Circuitry on a pavement will vary depending on the vehicle tire size, vehicle wheel size, number of tires to be equipped with the Road Contact Modules, length and size of the parking stall on merchant premises and other environmental conditions. The system is designed to ensure the vehicle is in full NFC contact with the merchant server when in a parked position. Additionally, the merchant can deploy parking lot markings or grooves or bumps to help guide the vehicle to properly position itself to be in full NFC contact. Furthermore, an audible signal or a visual signal could be deployed at the merchant's premises to inform the driver of the vehicle that his vehicle is locked in position for NFC communication with the merchant.

Wireless vs. Wireline Connection Between Road Contact Modules and Extension Circuitry Module The connection between a Road Contact Module and the Extension Circuitry Module could be either wireline or wireless (via NFC, a type of RF signal such as Bluetooth and the like). Further, utilizing a wireless connection technology such as NFC or Bluetooth between a Road Contact Module and the Extension Circuitry Module could simplify installation because there would not be any wiring to deal with. The disadvantage of a wireless connection is that the Road Contact Module would need to run on a battery, which would require replacement at a certain point of time depending on the life of the battery used to power the Road Contact Module. Furthermore, secure wireless connections are desirable. The wireless system is designed to avoid falsely detecting the Road Contact Module of a neighboring car, for example, by utilizing encryption or coding of signals.

In one embodiment, a wireline connection is utilized between multiple Road Contact Modules and the Extension Circuitry Module. Specifically, a rotating mechanical swivel hub can be deployed and mounted in the center of the wheel. See FIG. 6. Such a mechanical hub is physically attached to the wheel and spins with the wheel with the center of the hub always in a fixed position which is also the center of the wheel. Physical wiring electrically connects each Road Contact Module with the hub in the center of the wheel. Such wiring is also physically attached to the wheel and rotates with the wheel. The swivel hub maintains an electrical connection to the Extension Circuitry Module which is mounted elsewhere in the vehicle. (The exact location of the Extension Circuitry Module and installation procedure varies from car to car.) Hence each Road Contact Module is electrically connected, via a wireline connection through the hub, to the Extension Circuitry Module. It should be noted that there are numerous other electromechanical methods to connect via wireline a set of rotating Road Contact Modules with the Extension Circuitry Module.

MPEK

Figure 2A:
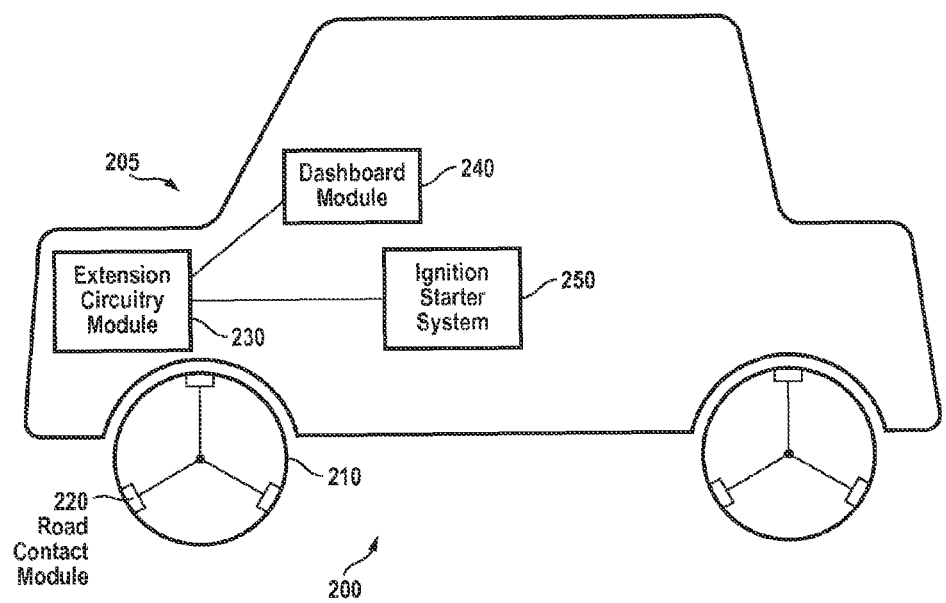
FIG. 2A illustrates one embodiment of a Mobile Payment Extension Kit.

The Mobile Payment Extension Kit (MPEK) is a modular hardware kit which can be installed professionally on a motor vehicle to equip such vehicle with mobile payment capability. FIG. 2A illustrates one embodiment of a MPEK 205. A MPEK 205 can contain three modules: one or more Road Contact Module(s) 220, an Extension Circuitry Model 230 and a Dashboard Module 240.

The technologies in the MPEK are intended to be either directly manufactured in the vehicle by the car manufacturers or the MPEK can be a kit for installation by a professional installer or end users for after-market applications.

Road Contact Module

In one embodiment, a MPEK 205 contains one or more NFC chips encapsulated in one or more Road Contact Modules 220 which can be mounted on the tire(s) 210 of a motor vehicle 200. Depending on the size of the tires 210 and types of vehicles, multiple Road Contact Modules 220 may be mounted in multiple positions on one or more tires 210 to ensure fast and efficient detection of the identity of the vehicle by the Merchant Road Detection Circuitry 100 installed by the merchant. The Road Contact Modules 220 can be mounted on the inside or outside of a tire 210 depending on the configuration of the tire and how the tire is installed in the vehicle. The NFC chip(s) on a Road Contact Module 220 may be pre-programmed with the identity of the motor vehicle (such as the Vehicle Identification Number), model and make of the car and information about its owner so as to facilitate automatic detection of the owner's credentials by the merchant. NFC chips today are commercially available for under $3 each and, with mass manufacturing, the cost of the NFC chips can be significantly reduced to allow the Road Contact Module 220 to be manufactured and made affordable to average consumers.

Extension Circuitry Module

In one embodiment, the Extension Circuitry Module 230 is the electrical circuit inside a motor vehicle 200 to electrically connect one or more Road Contact Modules 220 from the tire(s) 210 of a motor vehicle 200 to the Dashboard Module 240 mounted on the dashboard of a motor vehicle 200. The Extension Circuitry Module 230, powered by the battery of the motor vehicle 200, provides power to the Road Contact Module(s) 220 and Dashboard Module 240 and hosts a computer processor, memory and software to control and manage the communications between the user inside his vehicle and the merchant.

FIG. 3 illustrates an example of the communication path 300 between the Merchant Server 110, Merchant Road Detection Circuitry 100, Road Contact Module 220, Extension Circuitry Module 230, Dashboard Module 240 and user's NFC-enabled payment device such as an NFC-enabled Smartphone 340. In one embodiment, the Merchant Server 110 can have a wired connection with the Merchant Road Detection Circuitry 100, which can have an NFC connection with the Road Contact Module 220, which can have a wired connection with the Extension Circuitry Module 230, which can have a wired connection with the Dashboard Module 240, which can have an NFC connection with the NFC-enabled Device 340. The Merchant Server 110 and the Merchant Road Detection Circuitry can be provided as part of the merchant premises 310, and the Road Contact Module 220, Extension Circuitry Module 230 and Dashboard Module 240 can be provided as part of the user's Motor Vehicle 200, and can have wireless connections between the various Modules. The Dashboard Module 240 can communicate with the NFC-enabled Device 340 via NFC connection. Communication may originate at the Merchant Server 110 and progress through the Circuitry 100, Modules 220, 230 and 240 to the NFC-enabled Device 340, and vice-versa, i.e., communication may originate at the NFC-enabled Device 340 and progress through the Modules 240, 230 and 220 and the Circuitry 100 to the Merchant Server 110.

Figure 4:
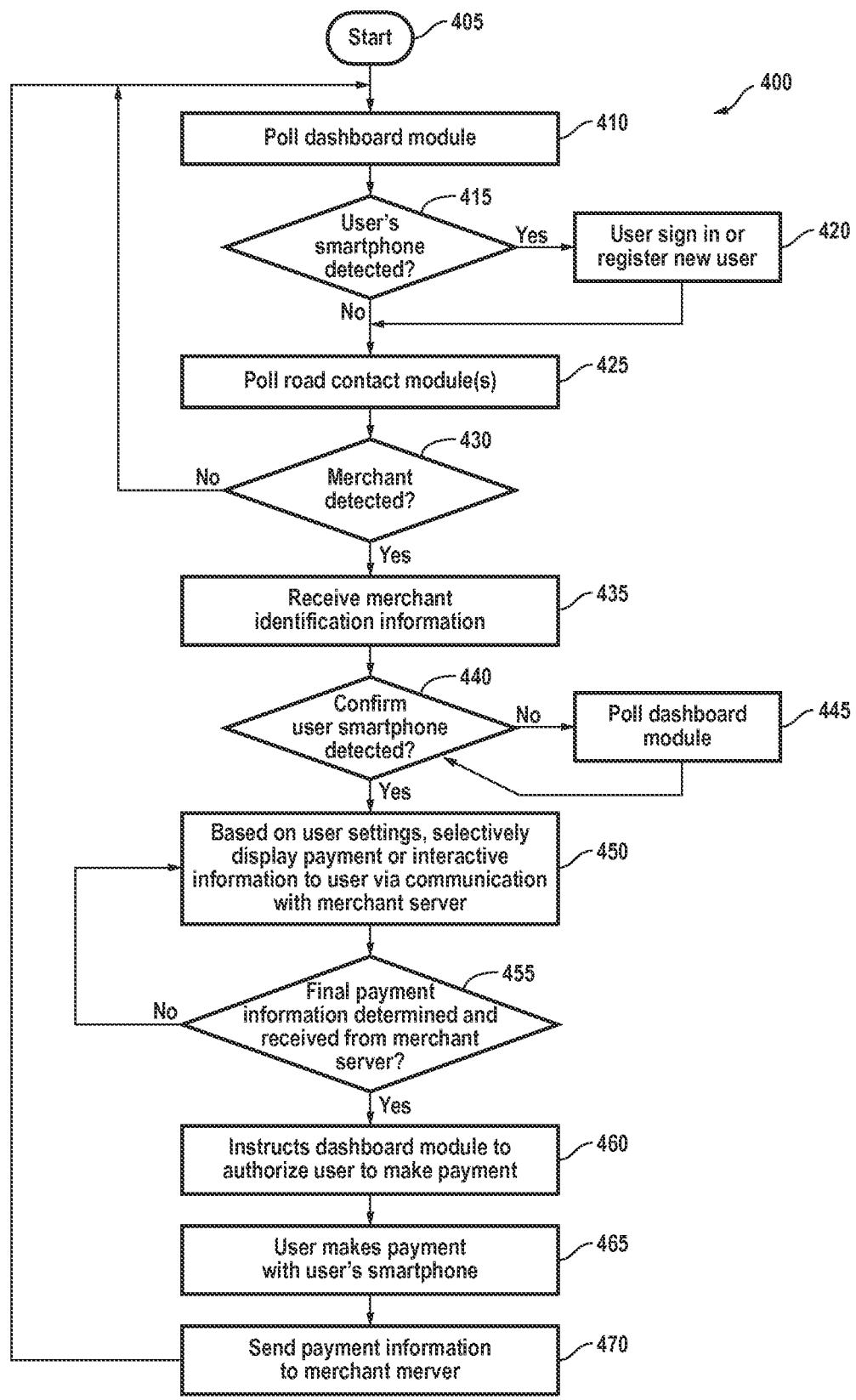
FIG. 4 shows a flow chart of execution of software inside the Extension Circuitry Module.

FIG. 4 shows a flow chart of the execution of the software inside the Extension Circuitry Module 230. Specifically, an Extension Circuitry Module Algorithm 400 includes the following steps, which may be preformed in any suitable order:

Start 405
Poll Dashboard Module 410
Query whether a User's Smartphone is detected 415
   If yes, then a User signs in or registers as a new user 420, and progresses to the next step
   If no, then go to the next step
Poll Road Contact Module(s) 425
Query whether a Merchant is detected 430
   If yes, then go to the next step
   If no, then the process returns to Step 410
Receive Merchant Identification Information 435
Confirm whether a user's Smartphone is detected 440
   If yes, then go to the next step
   If no, then Poll Dashboard Module 445 until the user's Smartphone is detected
Based on user settings, selectively display payment or interactive information to the user via communication with the Merchant Server 450
Query as to whether final payment information determined and received from the Merchant Server 455
   If yes, then go to the next step
   If no, then go to Step 450
Instruct Dashboard Module to authorize user to make payment 460
User makes payment with user's Smartphone 465
Send payment information to Merchant Server 470
Return to Step 410

In essence, the Extension Circuitry Module 230 acts as the brain of the vehicular-based mobile payment system and its function is to facilitate payment and other data communications between the user inside the vehicle and the merchant. The Extension Circuitry Module 230 may also be connected wirelessly to the Road Contact Module(s) 220 using an appropriate Radio Frequency (RF) technology in order to facilitate installation. However a wired connection between the Extension Circuitry Module 230 and Road Contact Module(s) 220 may be more secure for the purpose of processing payment information.

In some examples, as described, the Extension Circuitry Module 230 supports multiple simultaneous users. In these examples, the Extension Circuitry Module 230 is capable of supporting multiple simultaneous users where each user may be engaged in a different phase of a transaction independent of the activities of any other users. For example, a first user may be browsing a menu of purchase options while a second, different user may be executing a purchase transaction. And, a third, different user may be just in the process of signing in. The support of simultaneous users allows multiple occupants of a car to each pay for his own purchase and engage in transactions or communications independent from one another.

Dashboard Module

The Dashboard Module 240 contains one NFC chip and is typically mounted on the dashboard, steering wheel or instrument panel of a motor vehicle 200. The Dashboard Module 240 is the physical interface for the user to tap into the merchant's payment system. When a motor vehicle 200 is parked at a merchant's location equipped with Merchant Road Detection Circuitry 100, and the communication between the Dashboard Module 240 and Merchant's payment system is established by the Extension Circuitry Module 230, the user can simply tap an NFC-enabled Smartphone 340 enabled with mobile payment technology (for example, technologies comparable to the Google Wallet and the Google Wallet app) on the Dashboard Module 240 and instantly receive payment information on the item to be purchased from the merchant.

Payment and Additional Information Delivery

Once the communication between the Merchant Server 110 and the user's NFC-enabled Smartphone 340 is established, the merchant can send additional information to the user in addition to payment information. In one embodiment, a user may receive on his NFC-enabled Smartphone 340 parking information and rates from the merchant from the convenience of the inside of a car as soon as the car is parked. The parking information may contain helpful information such as the maximum number of hours allowed to park, parking rates, discounts, parking tips (such as tilting tires inward when parking downhill), street cleaning schedule, today's weather forecast, etc. Also, the user may be prompted to enter on his NFC-enabled Smartphone 340 how long to park so that the Merchant Server 110 can determine the actual payment amount. As another example, a user may receive a visual itemized list of all of the foods he just ordered at the drive-through of a fast food restaurant and be presented with a final bill to pay. Furthermore, the user may also receive from the merchant other non-payment related information from the merchant and approved advertisers. All advertisement and messages from the merchant are managed and sent by the merchant from the Merchant Server 110.

Personal Settings

Personal settings related to the Vehicular-based Mobile Payment System for a particular user can be set and changed via a user interface presented by the Dashboard Module 240 on the screen of the user's NFC-enabled Smartphone 340 and are completely configurable from inside a car. In one embodiment, Personal Settings function is rendered to the user on the user's NFC-enabled Smartphone 340 via an app developed in iOS, Android or other mobile operating system. This app communicates with the Extension Circuitry Module 230 and renders the appropriate user interface on the user's NFC-enabled Smartphone 340 under the control of the Extension Circuitry Module 230. Settings can include security settings, enabling or disabling mobile payment capability, filtering unwanted advertisement messages from the merchant, etc. All settings are stored in the memory of the Extension Circuitry Module 230 and can be changed by the user at any time from his Smartphone regardless of the presence of any Merchant Road Detection Circuitry 100. Settings can be unique to a particular user and not shared with other users who could share the same vehicle. The Extension Circuitry Module 230 can store the profiles and settings of multiple users (drivers) and only enable the settings/profile of the user who signs in to the System with his NFC-enabled Smartphone 340. Sign-in can be simply accomplished by a user tapping his NFC-enabled Smartphone 340 on the Dashboard Module 240. When a first-time user attempts to use the System, the Extension Circuitry Module 230 will identify this condition by detecting the identification information contained in the NFC chip of the user's NFC-enabled Smartphone 340 and prompts the user to enter a series of settings questions in order to set up the settings/profile of the new user. Once the settings/profile of a new user is set up, the new user is created and the user's settings are stored in the memory of the Extension Circuitry Module 230. Further, the user's profile settings can store additional user personal data such as preferred temperature in the car, personalized audio system settings including radio button settings, personalized seat positioning, personalized mirror settings and the like. The additional personal settings can be stored in the vehicle's Extension Circuitry Module 230, which can be electrically connected to the car's computer system to instruct the car's computer system to effect the requested changes.

In some implementations, personal settings of a user of a vehicle are stored on the user's mobile device (e.g., smartphone) in addition to settings stored by the vehicle. In these implementations, one or more users may store personal settings (e.g., security settings, preferred temperature settings, audio system settings, seat settings, mirror settings, navigation system settings, settings related to exchange of communications with devices outside of the vehicle, mobile payment settings, advertisement filtering settings, etc.) on an extension circuitry module of the vehicle. These settings may be changed via the user's smartphone when the user brings the phone to close proximity of the dashboard module. To further enhance the storage of personal settings, the user's personal settings may be stored on his or her smartphone in addition to being stored on the vehicle. In these implementations, the user may take his or her smartphone to any comparably equipped car (that is, a car equipped with the apparatus disclosed throughout this disclosure, such as a rental car), tap on the dashboard module of that car, and transfer all of his or her personal settings to the car.

In some examples, the extension circuitry module of the car (e.g., rental car) recognizes that this is a guest user (by checking its currently stored personal settings), checks system settings to determine whether the guest user is allowed, and if so, automatically transfers the guest user's settings data from the user's smartphone to the car's extension circuitry module. The extension circuitry module then registers the user as a guest user and automatically adapts the car to the guest user's preferred settings. In this regard, a guest user in a rental car enjoys the same set of features determined by his or her personal settings as he or she would in his or her own car under the same settings. For example, with one tap on the rental car's dashboard module, the extension circuitry module of the rental car will instruct the car to automatically adjust the seats, temperature, sound system settings, mobile payment options, etc. according to the user's settings.

In addition, in some examples, intelligence may be built into the rental car's extension circuitry module where if there are differences in capabilities between the rental car the user's own vehicle, then the rental car's extension circuitry module will do its best to approximate the original user settings. For example, if the preferred temperature setting is seventy-two degrees in the user's original car, and if the rental car only has temperature setting of high, medium and low, then the extension circuitry module of the rental car will compare the preferred temperature setting to ranges associated with high, medium, and low and, based on results of the comparison, set the temperature setting to the setting that has a temperature that includes seventy-two degrees (e.g., medium).

In some implementations, when the user finishes using the rental car, the user taps his smartphone on the dashboard module to unregister himself from the rental car's extension circuitry module and this action will trigger the rental car's extension circuitry module to permanently delete the settings of the guest user. In these implementations, all of the guest user's settings and data are deleted as a security feature because it is not desirable for the user's personal settings to be stored on a rental car after the user returns the rental car. To further protect privacy, the rental car's extension circuitry module may not ever store guest user settings, but instead require the setting to be transmitted through the dashboard module each time the guest user operates the rental car. In addition, as another security feature, the rental car's extension circuitry module may be configurable to automatically delete any guest user's personal settings after a fixed period of time (e.g., three days) if there is no sign-in activity detected from that guest user. Further, as another security feature, the rental car's extension circuitry module may be configurable to automatically delete an active guest user's personal settings when a different guest user registers with the rental car. Because a new guest user registration likely indicates that the previous guest user has departed, the previous guest user's personal settings are removed. This scenario may result from the previous guest user forgetting to unregister himself or herself as a user of the rental car when he or she returns the rental car.

In some examples, a new reporting and management feature can be used such that a rental car company anonymously collects and aggregates personal settings and mobile payment transaction history of all of guest drivers of all rental cars. The collected/aggregated data may be analyzed to determine users driving preferences and purchase habits while driving a car in general or while driving a particular type of car. An in-pavement vehicle detection system of the rental car company may download data from a rental car similar to how a mobile payment is made where the rental car is driven to a pavement embedded with the merchant road detection circuitry. Through a special command issued by the rental car agent, all of the aggregated user behavior data is downloaded from the rental car's extension circuitry module to the rental car system. After such a download, the aggregated data in the rental car may be automatically erased to make room for new data. In this regard, upon return, each car is driven to the designated parking area for data collection until data from all cars is collected.

Alternatively, the download of the aggregated user data described above may be accomplished by the rental car company bringing a smartphone or tablet device (loaded with a special application) to the vicinity of the dashboard module and automatically download aggregated user data to the smartphone or tablet. Again, after download is complete, the aggregated user data stored in the car may be automatically erased. The tablet or smartphone may be used to collect user data from car to car until all data is collected from all cars.

After collecting data, the rental car company may assign rental cars and perform actions related to rental cars based on an analysis of the data. For instance, the rental car company may provide targeted advertisements (or other information) based on a type of car a user selects and the past history of purchases made by users using that type of car. In addition, the rental car company may setup a rental car in the configuration the rental car has most frequently been used and/or may schedule maintenance for the rental car based on past and expected future usage (e.g., service an air condition system of the car more frequently when the past/expected usage indicates that the air condition system is typically set at a low setting). Further, the rental car system may access as much information about a potential renter as possible, compare that information against past renters, and assign a rental car that is most used by past renters that have characteristics most similar to the potential renter. The rental car company even may have an NFC reader located at a counter of the rental car agency and access the personal settings of the user at the rental counter. In this case, the personal settings may be used to select a vehicle that best matches the settings preferred by the user at the price point the user is willing to pay. In fact, the rental car system may make recommendations to either move to a more expensive rental to better match the preferences of the renter or move to a less expensive rental that still meets all of the preferences of the user.

By storing vehicle settings on a smartphone, the user may make his vehicular preferences/settings very portable. As long as the vehicle is equipped with the dashboard module and extension circuitry module and other components as described throughout this disclosure, the user may easily take his vehicular preferences/settings from vehicle to vehicle, which may offer significant convenience. Although techniques for portable settings has been described above with respect to rental cars as an example, the techniques are not limited to rental cars and may be applied to other vehicles, such as vehicles driven by multiple, different family members or other individuals.

Security Feature

The Extension Circuitry Module 230 can further act as a car security device to prevent drivers with unauthorized sign-in credentials from starting the vehicle. Authorized users can simply sign-in and unlock the vehicle by tapping his NFC-enabled Smartphone 340 on the Dashboard Module 240. The software in the Extension Circuitry Module 230 validates the credentials of a driver via his NFC-enabled Smartphone 340 and authorizes the vehicle to start only if the credentials are validated. The Extension Circuitry Module 230 may be electrically connected to the vehicle's ignition system 250 to perform this security function. This security feature can be made to be independent from the mobile payment system of this invention.

User Interactivity

This invention transforms a traditional mobile payment technology usable only at a fixed point of sale location into an interactive tool between the merchant and a user from the convenience of the user's vehicle at any location. The merchant will have more opportunities to present information to the user in addition to just prompting the user for payment as is the case in traditional mobile payment technology. Through the easy-to-use user interface of a Smartphone, the user will have ample opportunities to react to the messages brought to him by the merchant in addition to paying the merchant. The merchant may take advantage of this opportunity to further engage the user and provide better customer service.

User interactivity is made possible by communications between the Merchant Server 110 located at the merchant premises and the Extension Circuitry Module 230 located in the user's vehicle. The Merchant Server 110 and the Extension Circuitry Module 230 together determine what types of information to deliver to the user and what kind of inputs to receive from the user. In one embodiment, a particular type of communication protocol can be defined between the Merchant Server 110 and the Extension Circuitry Module 230 to facilitate the communication between them. For example, the underlying communication protocol for the transport layer and Internet layer may be TCP/IP and the application layer protocol may be Session Initiation Protocol (SIP). This protocol allows the Merchant Server 110 and the user's Extension Circuitry Module 230 to jointly determine what types of interactivity, if any, are to be delivered to the user. Through settings defined in a user's profile, a user can limit the type of interactions with the merchant. In the simplest possible scenario, the user can choose, through his settings in the Extension Circuitry Module 230, to only receive payment information and disallow any other types of messages from the merchant such as advertisements. Hence the Extension Circuitry Module 230 serves a filtering function on behalf of the user to filter out unwanted unsolicited messages from the Merchant Server 110.

In one embodiment, User Interactivity is rendered to the user on the user's NFC-enabled Smartphone 340 via an app developed in iOS, Android or other mobile operating system. This app communicates with the Extension Circuitry Module 230 and renders the appropriate user interface on the user's Smartphone depending on the results of communication between the Extension Circuitry Module 230 and the Merchant Server 110.

In one embodiment, the user may receive promotional messages relating to multiple services or products offered by the merchant and the user can select a particular service or product to purchase to suit the user's needs from the convenience of the user's NFC-enabled Smartphone 340. For example, a user in a parking lot may be presented with the hourly rates of parking and the user may select the number of hours to park and the Merchant Server 110 will compute the total payment due and instructs the Extension Circuitry Module 230 to deliver the payment notice to the user's NFC-enabled Smartphone 340 via the Dashboard Module 240.

In one embodiment, the user may receive advertisement messages on his NFC-enabled Smartphone 340 from the merchant or the merchant's business partners. The advertisement messages may be stored on the Merchant Server 110 and software on the Merchant Server 110 is able to make intelligent decision on what types of advertisement messages to deliver to the user by the user's identification information and by the settings in the user's profile stored in the vehicle's Extension Circuitry Module 230. Such targeted advertising can be served to the user based on the following targeting criteria:

Model and make of user's motor vehicle
Age of the user's motor vehicle
Type of tires of the user's motor vehicle
Type of products or services user just ordered
Location of the merchant
Date and time of the day
Nearby traffic related messages based on the merchant location
Community or public service messages based on merchant location In one embodiment, electronic coupons can also be optionally generated and delivered from the Merchant Server 110 to the user's NFC-enabled Smartphone 340, and the electronic coupons can be stored in an application loaded on the Smartphone 340. For example, if the merchant determines the user's vehicle is a Honda Accord, then the merchant can deliver Honda Accord related car repair or service coupons to the user's Smartphone. Interactivity can be enabled either before or after payment is made for as long as the user chooses to keep his NFC-enabled Smartphone 340 in close proximity to the Dashboard Module 240. An example of a User Interactivity after payment is made is for the merchant to conduct a customer survey directly on the user's Smartphone.

Dynamic User Interface Capability

The user interface can be determined by the user's settings and/or by the type of products or services the merchant is selling. The user interface need not necessarily be a fixed interface, and the user interface can be adapted to change depending on where the vehicle is located. For example, if the vehicle is located in a restaurant drive-through such as a McDonald's drive through, the user interface can be adapted to change to suit the needs of the restaurant drive-through, and if the vehicle is located at a parking garage, the user interface can be adapted to change to suit the needs of the parking garage. Also, a default user interface can be provided when the vehicle is not connected to a merchant server and/or when a customized user interface has not been established for a particular merchant or location.

User Interactivity—Voice Communication

In addition to transaction-based interactivity between the user (via his NFC-enabled Smartphone 340 and the Extension Circuitry Module 230) and the merchant (via the Merchant Server 110), such interactivity can be expanded to include ad hoc real-time voice communications. In one embodiment, if the communication protocols between the NFC-enabled Smartphone 340, Extension Circuitry Module 230 and the Merchant Server 110 are based on the protocol of SIP, then a SIP User Agent (UA) software module can be incorporated into the NFC-enabled Smartphone 340 (e.g., embedded in an app) and the Merchant Server 110 to enable Voice-over-IP communications between these 2 end points. Voice-over-IP (or VoIP) and SIP UA are well known in the art and will not be described here. FIG. 3A illustrates an example implementation of VoIP communication between the user's NFC-enabled Smartphone 340 and the Merchant Server 110 using the SIP technology. Those skilled in the art will appreciate there are many other possible implementations of enabling VoIP communications between the user's NFC-enabled Smartphone 340 and the Merchant Server 110. According to FIG. 3A, either the user or the merchant operator can initiate a VoIP call to the other party in order to conduct a real-time VoIP call. Either the user or the merchant operator can terminate the call at any time. Those skilled in the art will appreciate that multiple merchant operators can also be accommodated in this design via the use of one or more SIP proxy servers. Furthermore, intelligent call routing may be implemented to route a user initiated call to the first available merchant operator or the best-fit merchant operator. SIP, VoIP and call center technologies are well known in the art and will not be described here. Such real-time voice calls may be useful whenever the user desires live assistance from the merchant from the user's car. Conversely, the merchant may also place a VoIP call directly to the user's car to communicate necessary information to the user in real-time without having to know the user's phone number, thereby the user's privacy is protected.

User Interactivity—Video Communication

Similar to live voice communication described above, ad hoc live video communications may also be implemented between the user's NFC-enabled Smartphone 340 and a merchant operator. In one embodiment, SIP protocols may be used to set up, maintain and tear down a video call between the user and a merchant operator. Those skilled in the art will appreciate that multiple merchant operators can also be accommodated in this design via the use of one or more SIP proxy servers. Furthermore, intelligent call routing may be implemented to route a user initiated video call to the first available merchant operator or the best-fit merchant operator. SIP, VoIP, video calls and call center technologies are well known in the art and will not be described here. Using SIP to implement video calls is well known in the art and will not be described here. Such real-time video calls may be useful whenever the user desires live assistance or live visual aid from the merchant from the user's car. As another example, the merchant may require to see the user's face for security and authentication purposes in order to authorize a transaction. Conversely, the merchant may also place a video call directly to the user's car to communicate necessary information to the user.

User Interactivity—Instant Messaging

Similar to live voice communication described above, ad hoc live chat (or instant messaging) communications may also be implemented between the user's NFC-enabled Smartphone 340 and a merchant operator. In one embodiment, SIP protocols may be used to set up, maintain and tear down a text chat or instant messaging session between the user and a merchant operator. Using SIP to implement text chat or instant messaging sessions is well known in the art and will not be described here. Such real-time instant messaging sessions may be useful whenever the user desires live assistance from the merchant from the user's car. Conversely, the merchant may also initiate an instant messaging session directly to the user's car to communicate necessary information to the user in real time.

Ad Hoc Social Group

As discussed above, the system described throughout this disclosure supports many types of ad hoc connections, such as voice, video, and instant messaging connections. In this regard, the ad hoc connections described establish a social group between a connected user and a merchant operator. Specifically, when a user drives his or her vehicle to a position where at least one road contact module (e.g., road contact transceiver) is able to communicate with an in-pavement vehicle detection system of a merchant, an ad hoc social group is formed between the user inside the vehicle and the merchant operator, and the user and the merchant operator can engage in ad hoc voice, video, and/or instant messaging chat. The ad hoc connection and social group disappears as the user drives away and no longer in position to enable communication through the in-pavement vehicle detection system of the merchant.

In some implementations, the ad hoc social group may be expanded and may include multiple vehicles with the merchant operator. For instance, an ad hoc social group may be formed between all users who park their cars in the merchant's designated parking area or drive-through lane area) embedded with the merchant road detection circuitry. That is, the ad hoc social/chat group may be enhanced to include one or more merchant operators and one or more users who park their cars in the merchant's parking area at the same time. This type of ad hoc social group may be useful for the customers to share their purchase experience (similar to how two strangers in a supermarket can share grocery shopping experience) from the convenience of inside their cars. In addition, a first customer may chat with a second customer parked in a car next to the first customer and also may talk to a merchant operator to get the best experience for both customers at the merchant. When a user drives away from the merchant's parking area, that user is automatically removed from the ad hoc social group. In addition, because all communication flows through the merchant road detection circuitry, personal information (e.g., name, phone number, etc.) of mobile devices that are used to interact in the ad hoc social group is not shared with other participants in the group and, thus, privacy of all users may be maintained.

Pre-Pay and Post-Pay

The mechanism of this invention offers the flexibility for a user to pay for services from a merchant either before the service is rendered or after the service is rendered provided the merchant allows this flexibility. This is in contrast with traditional mobile payment technology which requires a user to pay for the services on the spot as soon as service is rendered. For example, when a user pulls his car equipped with MPEK into a parking space, the user can have the flexibility to pay for parking based on the duration of his actual stay without having to make payment upfront. In this example, the following steps are performed:

User pulls his MPEK equipped car into a parking space equipped with Merchant Road Detection Circuitry 100.

User interacts with the merchant via the User Interactivity capability (described earlier) from his NFC-enabled Smartphone 340 to determine the types of services to be purchased.

The Extension Circuitry Module 230, with the user inputs accepted from User Interactivity, communicates with the Merchant Server 110 and subsequently communicates with the user whether pre-pay or post-pay is allowed.

In the event the Merchant Server 110 determines, based on the identity of the user, the Settings of the user and the type of services desired, immediate payment is required, then the Extension Circuitry Module 230 prompts the user to make payment immediately from his NFC-enabled Smartphone 340. This would be the pre-pay or pay-now scenario.

In the event the Merchant Server 110 determines payment can be made after the service is rendered, then the Extension Circuitry Module 230 notifies the user via the user's NFC-enabled Smartphone 340. For example, the merchant may require the user to pay for parking after the user returns to his car.

The user leaves the car and the Merchant Server 110 starts a timer to time the duration of the service.

The user returns to his car and taps his NFC-enabled Smartphone 340 to the Dashboard Module 240 of his car to notify the Merchant Server 110 of his return.

Through User Interactivity, the user notifies the Dashboard Module 240 to end the service (parking) from his NFC-enabled Smartphone 340.

The Dashboard Module 240 communicates with the Extension Circuitry Module 230 which in turns communicates with the Merchant Server 110 which stops the timer and determines the final payment amount due based on the duration of the user's stay.

The Merchant Server 110 communicates the final payment amount to the user's NFC-enabled Smartphone 340 via the Extension Circuitry Module 230.

The user makes payment from his NFC-enabled Smartphone 340.

The above example illustrates how a post-pay service such as parking service can be provided by this invention. Other post-pay services can be easily provided via the same mechanisms.

Payment Authorization and Confirmation

Figure 5:
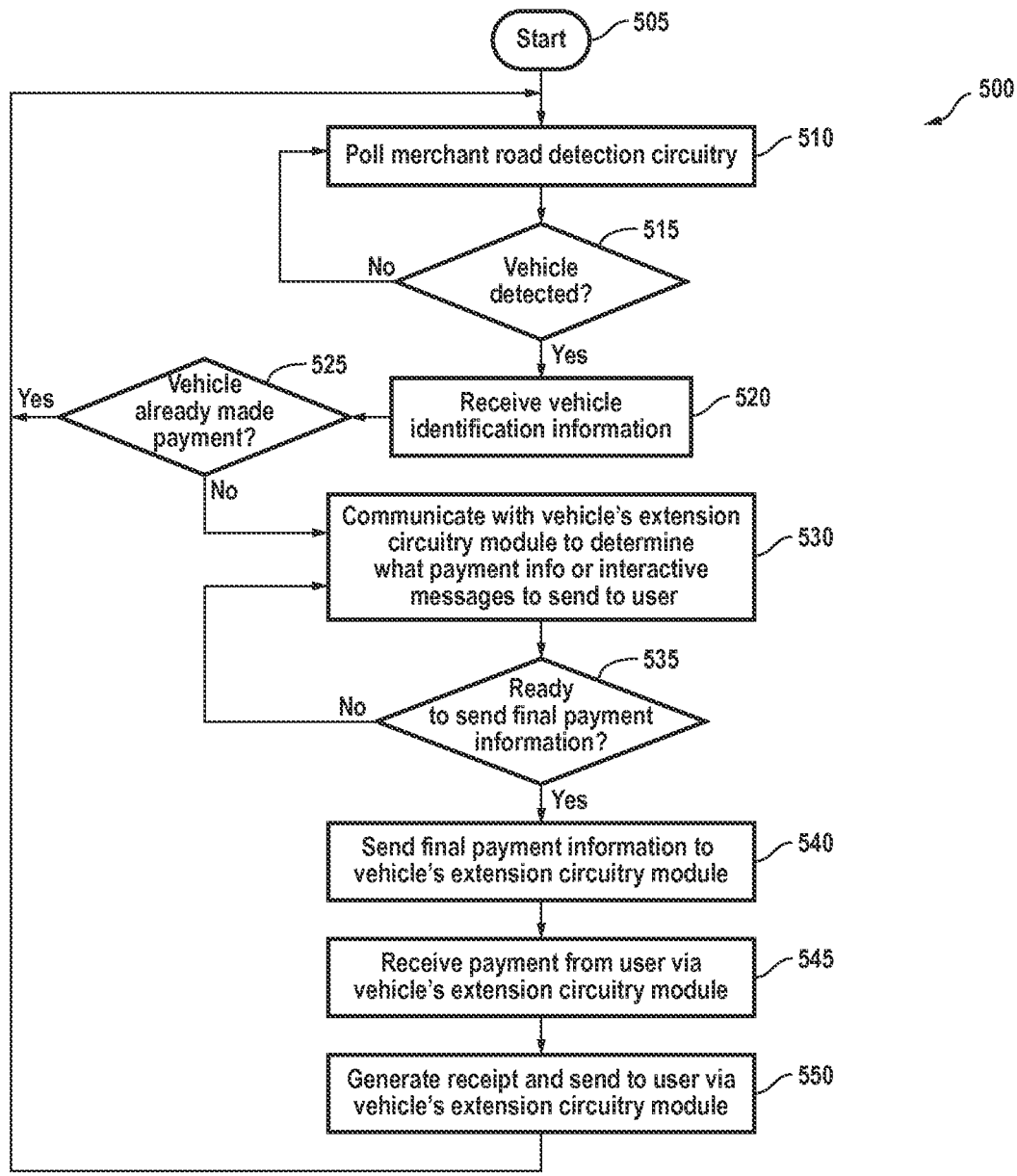
FIG. 5 is a flow chart of an algorithm of the Merchant Server.

The final step in completing the sale transaction is for the user to authorize payment for the merchant's goods or services. In the simplest form and in the absence of any User Interactivity, the user can simply tap his NFC-enabled Smartphone 340 on the Dashboard Module 240 and complete the sale transaction. When User Interactivity is involved, final payment authorization can be performed by the user tapping his NFC-enabled Smartphone 340 on the Dashboard Module 240 or bringing his NFC-enabled Smartphone 340 to close proximity of the Dashboard Module 240; followed by pressing a confirmation button on the screen of the NFC-enabled Smartphone 340. The payment authorization step otherwise follows standard mobile payment transactions commercially available today. Commercially available mobile payment technology includes, for example, Google Wallet which consists of a payment service and an Android app by Google to allow users to store credit card, debit card and store loyalty data on a virtual wallet—e.g., as an app downloadable to an NFC-enabled Android Smartphone. Final payment information is sent to the payment terminal function in the Merchant Server 110 to complete the transaction. Merchant Server 110 may optionally send a receipt or confirmation to the NFC-enabled Smartphone 340 of the user via the Extension Circuitry Module 230. FIG. 5 is a flow chart of the algorithm of the Merchant Server 110. FIG. 5 outlines the steps a Merchant Server 110 performs in order to communicate with the user inside a vehicle to complete the payment process. Specifically, a Merchant Server Algorithm 500 includes the following steps, which may be preformed in any suitable order:

Start 505

Poll Merchant Road Detection Circuitry 510

Query as to whether a vehicle is detected 515
   If yes, then the proceed to the next step
   If no, then return to Step 510

Receive Vehicle Identification Information 520

Query as to whether the vehicle already made payment 525
   If yes, then return to Start 505
   If no, then go to the next step Communicate with vehicle's extension circuitry module to determine what payment information or interactive messages to send to the user 530

Query as to whether a user is ready to send final payment information 535
   If yes, then go to the next step
   If no, then return to Step 530

Send final payment information to the vehicle's Extension Circuitry Module 540

Receive payment from user via vehicle's Extension Circuitry Module 545

Generate receipt and send to user via vehicle's Extension Circuitry Module 550

A customer client system may include one or more processing units (CPU's), one or more network or other communications interfaces, memory, and one or more communication buses for interconnecting these components. The customer client system may include a user interface, for instance a display and a keyboard. The memory may include high speed random access memory and may also include non-volatile memory, such as one or more magnetic or optical storage disks. The memory may include mass storage that is remotely located from CPU's. The memory may store the following elements, or a subset or superset of such elements: an operating system that includes procedures for handling various basic system services and for performing hardware dependent tasks; a network communication module (or instructions) that is used for connecting the customer client system to other computers via the one or more communications interfaces (wired or wireless), such as the Internet, other wide area networks, local area networks, metropolitan area networks, and so on; a client application; optionally, a cache of downloaded and a cache downloaded, as well as other information for viewing using the client application, and information retrieved by user selection of one or more items.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, various components described herein can include electrical circuit(s) that can include components and circuitry elements of suitable value in order to implement the embodiments of the subject innovation(s). Furthermore, many of the various components can be implemented on one or more integrated circuit (IC) chips. For example, in one embodiment, a set of components can be implemented in a single IC chip. In other embodiments, one or more of respective components are fabricated or implemented on separate IC chips.

The above description includes examples and implementations. It is, of course, not possible to describe every conceivable combination of components or methodologies for purposes of describing the claimed subject matter. Therefore, many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure, including what is described in the Abstract, is not intended to be exhaustive or to limit the disclosed implementations to the precise forms disclosed. While specific examples are described herein for illustrative purposes, various modifications are possible that are considered within the scope of such examples.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, the innovation includes a system as well as a computer-readable storage medium having computer-executable instructions for performing the acts and/or events of the various methods of the claimed subject matter.

The aforementioned systems/circuits/modules have been described with respect to interaction between several components/blocks. Such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Although some of various drawings illustrate a number of logical stages in a particular order, stages which are not order dependent can be reordered and other stages can be combined or broken out. Alternative orderings and groupings, whether described above or not, can be used. Moreover, the stages could be implemented in hardware, firmware, or a combination of hardware and software.

The foregoing description, for purpose of explanation, has been described with reference to specific implementations. However, the illustrative discussions above are not intended to be exhaustive or to be limiting to the precise forms disclosed. Many modifications and variations are possible in view of the above teachings. The implementations were chosen and described in order to best explain the principles of the aspects and its practical applications, to thereby enable others skilled in the art to best utilize the aspects and various implementations with various modifications as are suited to the particular use contemplated.

What is claimed is:

1. A method comprising:
   detecting, by extension circuitry, a guest personal mobile communication device that is positioned to wirelessly communicate with at least one of one or more wireless transceivers, wherein:
     the guest personal mobile communication device is a communication device of a guest user that is attempting to use a vehicle,
     the one or more wireless transceivers are located in the vehicle and are configured to communicate with personal mobile communication devices that are located within a passenger compartment of the vehicle,
     the extension circuitry is electrically connected to one or more road contact transceivers and the one or more wireless transceivers,
     the extension circuitry is configured to manage communications between the one or more road contact transceivers, the one or more wireless transceivers, in-pavement vehicle detection systems, and personal mobile communication devices,
     the one or more road contact transceivers are arranged so that at least one of the one or more road contact transceivers is within a predetermined distance from a first in-pavement vehicle detection system of a first type based on rotatable wheels of the vehicle being located on pavement at a position above the first in-pavement vehicle detection system, and
     the one or more road contact transceivers are configured to transmit information to and receive information from the first in-pavement vehicle detection system based on at least one of the one or more road contact transceivers being within the predetermined distance from the first in-pavement vehicle detection system;
   based on detection of the guest personal mobile communication device, monitoring, by the extension circuitry, for presence of an owner personal mobile communication device in position to wirelessly communicate with at least one of the one or more wireless transceivers, the owner personal mobile communication device having been registered to the extension circuitry as a device that is able to use the vehicle and authorize guests to use the vehicle;
   based on the monitoring for presence of the owner personal mobile communication device, detecting, by the extension circuitry, the owner personal mobile communication device in position to wirelessly communicate with at least one of the one or more wireless transceivers;
   based on detection of the owner personal mobile communication device, authorizing, by the extension circuitry, use of the vehicle by the guest personal mobile communication device and receiving, from the guest personal mobile communication device through at least one of the one or more wireless transceivers, guest vehicle settings stored by the guest personal mobile communication device, the guest vehicle settings defining preferences of the guest user for settings associated with use of the vehicle and settings associated with communications exchanged with in-pavement vehicle detection systems by the guest personal mobile communication device;
   after authorization of use of the vehicle by the guest personal mobile communication device, detecting, by the extension circuitry, a passenger personal mobile communication device that is positioned to wirelessly communicate with at least one of the one or more wireless transceivers, the passenger personal mobile communication device being a communication device of a passenger user who is located in the passenger compartment of the vehicle;
   based on detection of the passenger personal mobile communication device, receiving, from the passenger personal mobile communication device through at least one of the one or more wireless transceivers, passenger vehicle settings stored by the passenger personal mobile communication device, the passenger vehicle settings defining preferences of the passenger user for settings associated with use of the vehicle and settings associated with communications exchanged with in-pavement vehicle detection systems by the passenger personal mobile communication device;
   accessing, from electronic storage, vehicle rules that define permissible settings for the vehicle, the accessed vehicle rules having been defined based on communication with the owner personal mobile communication device through at least one of the one or more wireless transceivers;
   evaluating, by the extension circuitry, the received guest vehicle settings and the received passenger vehicle settings with respect to the accessed vehicle rules;
   based on the evaluation, determining, by the extension circuitry, current vehicle settings for settings associated with use of the vehicle by the guest user and the passenger user and settings associated with communications exchanged with in-pavement vehicle detection systems by the guest personal mobile communication device and the passenger personal mobile communication device, the current vehicle settings meeting a subset of the preferences of the guest user and a subset of the preferences of the passenger user;
   monitoring, by the extension circuitry, for an ability to connect with the first in-pavement vehicle detection system through at least one of the one or more road contact transceivers, the first in-pavement vehicle detection system being able to simultaneously connect with multiple vehicles through road contact transceivers;
   based on the monitoring for the ability to communicate with the first in-pavement vehicle detection system, detecting, by the extension circuitry, the ability to communicate with the first in-pavement vehicle detection system;
based on detection of the ability to communicate with the first in-pavement vehicle detection system, adding, by the extension circuitry and in accordance with the current vehicle settings, the vehicle to a first ad hoc social group that includes the multiple vehicles simultaneously connected to the first in-pavement vehicle detection system through road contact transceivers;
determining, by the extension circuitry, that the first in-pavement vehicle detection system has the first type;
based on the current vehicle settings and the determination that the first in-pavement vehicle detection system has the first type, enabling, by the extension circuitry, the passenger personal mobile communication device to interact with the first ad hoc social group without revealing identifying information associated with the passenger personal mobile communication device;
automatically, without user intervention, disconnecting, by the extension circuitry, from the first ad hoc social group based on the vehicle moving to a position in which the one or more road contact transceivers are outside of the predetermined distance from the first in-pavement vehicle detection system;
detecting, by the extension circuitry, the ability to communicate with a second in-pavement vehicle detection system of a second type, the second in-pavement vehicle detection system being different than the first in-pavement vehicle detection system and the second type being different than the first type;
based on detection of the ability to communicate with the second in-pavement vehicle detection system, adding, by the extension circuitry and in accordance with the current vehicle settings, the vehicle to a second ad hoc social group that includes multiple vehicles simultaneously connected to the second in-pavement vehicle detection system through road contact transceivers;
determining, by the extension circuitry, that the second in-pavement vehicle detection system has the second type; and
enabling, by the extension circuitry, the guest personal mobile communication device to interact with the second ad hoc social group based on the determination that the second in-pavement vehicle detection system has the second type.

2. The method of claim 1:
wherein enabling the passenger personal mobile communication device to interact with the first ad hoc social group comprises generating a first interface appropriate for interacting with the first ad hoc social group based on capabilities of the first in-pavement vehicle detection system and sending, to the passenger personal mobile communication device through at least one of the one or more wireless transceivers, the generated first interface; and
wherein enabling the guest personal mobile communication device to interact with the second ad hoc social group comprises generating a second interface appropriate for interacting with the second ad hoc social group based on capabilities of the second in-pavement vehicle detection system and sending, to the guest personal mobile communication device through at least one of the one or more wireless transceivers, the generated second interface, which is different than the first interface.

3. The method of claim 1, wherein enabling the passenger personal mobile communication device to interact with the first ad hoc social group without revealing identifying information associated with the passenger personal mobile communication device comprises enabling the passenger personal mobile communication device to engage in a voice communication session that involves the multiple vehicles simultaneously connected to the first in-pavement vehicle detection system through road contact transceivers, the voice communication session being arranged through the first in-pavement vehicle detection system without revealing telephone numbers of any of personal mobile communication device used to engage in the voice communication session.

4. The method of claim 1, wherein enabling the passenger personal mobile communication device to interact with the first ad hoc social group without revealing identifying information associated with the passenger personal mobile communication device comprises enabling the passenger personal mobile communication device to engage in a video communication session that involves the multiple vehicles simultaneously connected to the first in-pavement vehicle detection system through road contact transceivers, the video communication session being arranged through the first in-pavement vehicle detection system without revealing telephone numbers of any of personal mobile communication device used to engage in the video communication session.

5. The method of claim 1, wherein enabling the passenger personal mobile communication device to interact with the first ad hoc social group without revealing identifying information associated with the passenger personal mobile communication device comprises enabling the passenger personal mobile communication device to engage in a text-messaging communication session that involves the multiple vehicles simultaneously connected to the first in-pavement vehicle detection system through road contact transceivers, the text-messaging communication session being arranged through the first in-pavement vehicle detection system without revealing telephone numbers of any of personal mobile communication device used to engage in the video communication session.

6. The method of claim 1, wherein authorizing use of the vehicle by the guest personal mobile communication device comprises automatically authorizing use of the vehicle by the guest personal mobile communication device upon detection of the owner personal mobile communication device without requiring any input be provided at the owner personal mobile communication device.

7. The method of claim 1, wherein authorizing use of the vehicle by the guest personal mobile communication device comprises sending, to the owner personal mobile communication device through at least one of the one or more wireless transceivers, a communication requesting authorization of the guest personal mobile communication device and receiving, from the owner personal mobile communication device through at least one of the one or more wireless transceivers, a response indicating that the owner personal mobile communication device received input authorizing use of the vehicle by the guest personal mobile communication device.

8. The method of claim 1, wherein accessing, from electronic storage, vehicle rules that define permissible settings for the vehicle comprises accessing, from electronic storage, vehicle rules that define permissible ranges of values for settings associated with use of the vehicle.

9. The method of claim 1, wherein accessing, from electronic storage, vehicle rules that define permissible settings for the vehicle comprises accessing, from electronic storage, vehicle rules that define what information about the vehicle is available for sending in communications exchanged with in-pavement vehicle detection systems.

10. The method of claim 1, wherein accessing, from electronic storage, vehicle rules that define permissible settings for the vehicle comprises accessing, from electronic storage, vehicle rules that define priority criteria for resolving inconsistencies in preferred vehicle settings received from different personal mobile communication devices, the priority criteria indicating that preferred settings of a driver are given priority over preferred settings of a passenger for driver-related vehicle settings, that preferred settings of a passenger are given priority over preferred settings of a driver for passenger-related vehicle settings, and that preferred settings of a driver are given priority over preferred settings of a passenger for general vehicle settings that are not specific to a driver or a passenger.

11. The method of claim 1, wherein accessing, from electronic storage, vehicle rules that define permissible settings for the vehicle comprises accessing, from electronic storage, vehicle rules that define best fit criteria for resolving inconsistencies in preferred vehicle settings received from different personal mobile communication devices, the best fit criteria being designed to result in one or more compromise settings that represent a best fit in matching all received settings without exactly matching any received setting.

12. The method of claim 1, wherein accessing, from electronic storage, vehicle rules that define permissible settings for the vehicle comprises accessing, from electronic storage, vehicle rules that adapt vehicle settings to a closest setting based on impermissible settings being received.

13. The method of claim 1, wherein adding, in accordance with the current vehicle settings, the vehicle to a first ad hoc social group that includes the multiple vehicles simultaneously connected to the first in-pavement vehicle detection system through road contact transceivers comprises automatically, without user intervention, adding the vehicle to the first ad hoc social group, the first ad hoc social group being arranged in a closed configuration in which all communications between vehicles pass through the first in-pavement vehicle detection system and only vehicles positioned to connect to the first in-pavement vehicle detection system through a road contact transceiver are part of the first ad hoc social group.

14. The method of claim 1:
wherein determining current vehicle settings for settings associated with use of the vehicle by the guest user and the passenger user and settings associated with communications exchanged with in-pavement vehicle detection systems by the guest personal mobile communication device and the passenger personal mobile communication device comprises determining that only the passenger personal mobile communication device is set to participate in ad hoc social groups based on the evaluation revealing that the received guest vehicle settings indicate that the guest user does not wish to participate in ad hoc social groups and that the received passenger vehicle settings indicate that the passenger user wishes to participate in ad hoc social groups; and
wherein enabling the passenger personal mobile communication device to interact with the first ad hoc social group comprises:
determining that the current vehicle settings indicate that the passenger personal mobile communication device is set to participate in ad hoc social groups and the guest personal mobile communication device is not set to participate in ad hoc social groups; and
enabling only the passenger personal mobile communication device to interact with the first ad hoc social group based on the determination that the current vehicle settings indicate that the passenger personal mobile communication device is set to participate in ad hoc social groups and the guest personal mobile communication device is not set to participate in ad hoc social groups.

15. The method of claim 1:
wherein determining current vehicle settings for settings associated with use of the vehicle by the guest user and the passenger user and settings associated with communications exchanged with in-pavement vehicle detection systems by the guest personal mobile communication device and the passenger personal mobile communication device comprises determining that the guest personal mobile communication device and the passenger personal mobile communication device are set to participate in ad hoc social groups based on the evaluation revealing that the received guest vehicle settings indicate that the guest user wishes to participate in ad hoc social groups and that the received passenger vehicle settings indicate that the passenger user wishes to participate in ad hoc social groups; and
wherein enabling the passenger personal mobile communication device to interact with the first ad hoc social group comprises
determining that the current vehicle settings indicate that the passenger personal mobile communication device is set to participate in ad hoc social groups and the guest personal mobile communication device is set to participate in ad hoc social groups; and
enabling both the guest personal mobile communication device and the passenger personal mobile communication device to interact with the first ad hoc social group based on the determination that the current vehicle settings indicate that the passenger personal mobile communication device is set to participate in ad hoc social groups and the guest personal mobile communication device is set to participate in ad hoc social groups.

16. The method of claim 15, wherein enabling both the guest personal mobile communication device and the passenger personal mobile communication device to interact with the first ad hoc social group comprises presenting the guest personal mobile communication device and the passenger personal mobile communication device to the first ad hoc social group as only the vehicle such that communications sent from the guest personal mobile communication device appear to the first ad hoc social group in a same manner as communications sent from the passenger personal mobile communication device to the first ad hoc social group.

17. The method of claim 15, wherein enabling both the guest personal mobile communication device and the passenger personal mobile communication device to interact with the first ad hoc social group comprises presenting the guest personal mobile communication device and the passenger personal mobile communication device to the first ad hoc social as separate devices within the vehicle such that communications sent from the guest personal mobile communication device appear to the first ad hoc social group in a different manner than communications sent from the passenger personal mobile communication device to the first ad hoc social group.

* * * * *